United States Patent
Chrysanthakopoulos

(10) Patent No.: US 10,088,317 B2
(45) Date of Patent: Oct. 2, 2018

(54) HYBRID-APPROACH FOR LOCALIZATION OF AN AGENT

(75) Inventor: Georgios Chrysanthakopoulos, Seattle, WA (US)

(73) Assignee: Microsoft Technologies Licensing, LLC, Redmond, WA (US)

( * ) Notice: Subject to any disclaimer, the term of this patent is extended or adjusted under 35 U.S.C. 154(b) by 1318 days.

(21) Appl. No.: 13/156,341

(22) Filed: Jun. 9, 2011

(65) Prior Publication Data

US 2012/0316784 A1 Dec. 13, 2012

(51) Int. Cl.
G01C 21/00 (2006.01)
B25J 9/16 (2006.01)
G01C 11/06 (2006.01)
G01C 21/20 (2006.01)

(52) U.S. Cl.
CPC .......... G01C 21/005 (2013.01); B25J 9/1697 (2013.01); G01C 11/06 (2013.01); G01C 21/206 (2013.01)

(58) Field of Classification Search
CPC .......... G06F 17/3079; G06F 17/30784; G06F 17/30799–17/30814; G06F 17/30241–17/30262; Y10S 901/47; G05D 1/0274; G05D 1/0246; G06K 9/00664; G06K 9/00711; G06K 9/00718; G06K 9/00744; G06K 9/00758; G06K 9/46–9/527; G06K 9/62–9/82; G01C 11/00; G01C 11/06–11/28; G01C 21/206; B25J 9/1697

USPC .......... 701/23–28, 300, 467, 514, 520, 523; 700/245, 250, 253; 901/1
See application file for complete search history.

(56) References Cited

U.S. PATENT DOCUMENTS

| | | | |
|---|---|---|---|
| 5,267,042 A | 11/1993 | Tsuchiya et al. | |
| 5,699,444 A | 12/1997 | Palm | |
| 7,003,136 B1 | 2/2006 | Harville | |
| 7,860,301 B2 | 12/2010 | Se et al. | |
| 2005/0096790 A1* | 5/2005 | Tamura et al. | 700/245 |
| 2006/0178828 A1 | 8/2006 | Moravec | |
| 2007/0013710 A1 | 1/2007 | Higgins et al. | |
| 2009/0094140 A1* | 4/2009 | Kwan | 705/28 |
| 2009/0287702 A1* | 11/2009 | Pascucci | 707/7 |
| 2010/0204964 A1 | 8/2010 | Pack et al. | |

OTHER PUBLICATIONS

Simmons et al., "Probabilistic Robot Navigation in Partially Observable Environments", 1995, Carnegie Mellon University.*

(Continued)

*Primary Examiner* — Spencer D Patton
(74) *Attorney, Agent, or Firm* — International IP Law Group, P.L.L.C.

(57) ABSTRACT

Methods and systems for determining the location of an agent within an environment using a hybrid approach are provided. The hybrid approach allows a potentially large physical space to be compressed in the form of a directed graph, in which edges are paths and nodes are locations. An image comparison produces observations for each location and path, which can be used to probabilistically locate the agent in the environment and to select a portion of the 3D point cloud for comparison. The agent can then be localized within the 3D point cloud, or metric-accurate map, using the same features utilized for image matching in the probabilistic location.

18 Claims, 26 Drawing Sheets

(56) References Cited

OTHER PUBLICATIONS

Tully et al., "Hybrid Localization Using the Hierarchical Atlas", 2007, Carnegie Mellon University.*
Ranganathan, Ananth, "Probabilistic Topological Maps", Apr. 2008, Georgia Institute of Technology.*
Dryanovski et al., "Multi-Volume Occupancy Grids: an Efficient Probabilistic 3D Mapping Model for Micro Aerial Vehicles", Oct. 2010, IEEE/RST International Conference on Intelligent Robots and Systems, pp. 1553-1559.*
Zhao, et al., "Alignment of continuous video onto 3D point clouds", Retrieved at «http://ieeexplore.ieee.org/stamp/stamp.jsp?tp=&arnumber=1453517», IEEE Transactions on Pattern Analysis and Machine Intelligence, vol. 27 No. 8, Aug. 2005, pp. 1305-1318.
Adachi, et al., "Self-Location Estimation of a Moving Camera Using the Map of Feature Points and Edges of Environment", Retrieved at «http://ieeexplore.ieee.org/stamp/stamp.jsp?tp=&arnumber=4259834», World Automation Congress, Jul. 24-26, 2006, pp. 6.

\* cited by examiner

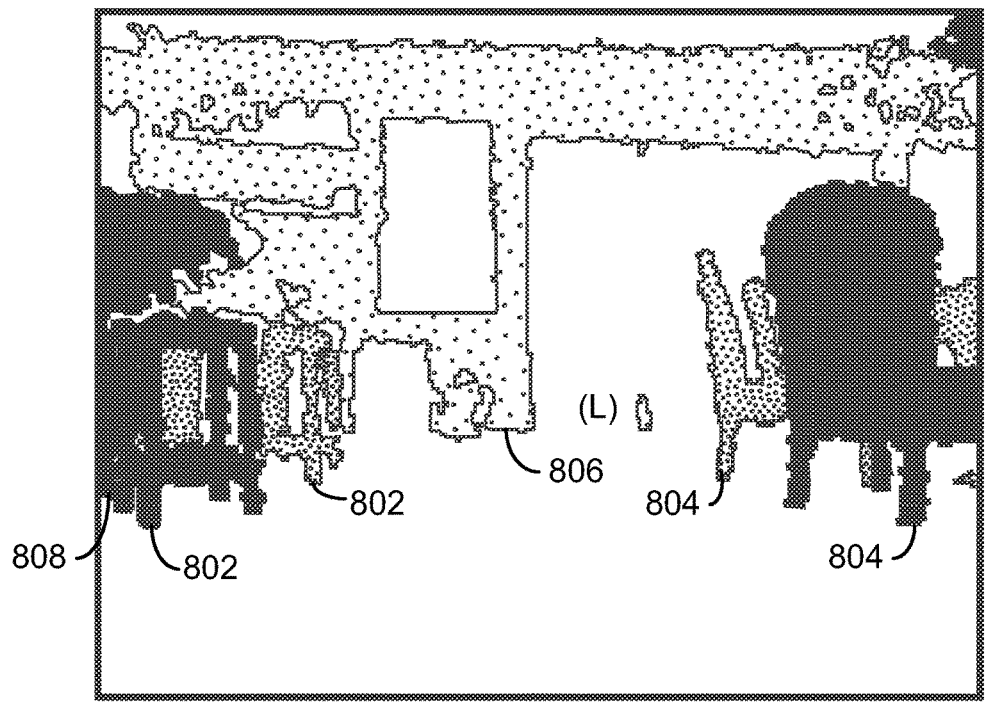
(A)
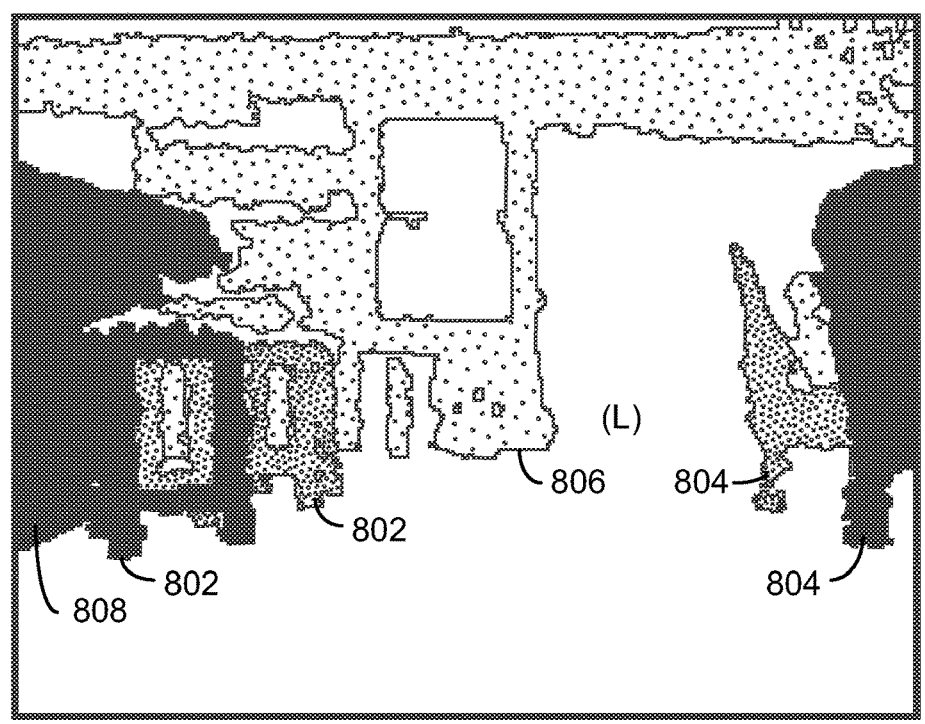
(B)
800
FIG. 8

HIGH-LEVEL TRANSITION INFORMATION 1006

| RELATIONSHIPS AMONG LOCATIONS | TYPES OF ACTIONS | | | |
|---|---|---|---|---|
| | DoNothing | Rotate | NavigateTo | Explore |
| SameLocation | HT | 1-MHTP | HTP | HTP |
| EdgeTowards | ZTP | ZTP | STP | STP |
| EdgeGoingAway | ZTP | STP | ZTP | STP |
| OriginForEdge | ZTP | MHTP | STP | STP |
| DestinationForEdge | ZTP | ZTP | ZTP | STP |
| OtherElement | ZTP | ZTP | ZTP | ZTP |
| ElementsSharingEdge | ZTP | ZTP | ZTP | ZTP |
| EdgeWithSharedOrigin | ZTP | STP | STP | STP |
| EdgeWithSharedDestination | ZTP | STP | STP | STP |
| ReverseEdge | ZTP | STP | ZTP | STP |
| EdgeThroughOneInterM | ZTP | ZTP | ZTP | ZTP |
| EdgeThroughTwoInterM | ZTP | ZTP | ZTP | ZTP |

ZeroTransitionProb = ZTP = 0.0
SmallTransitionProb = STP = 0.000001
MediumTransitionProb = MTP = 0.0001
MediumHighTransitionProb = MHTP = 0.15
HighTransitionProb = HTP = 0.99
HighestTransition = HT = 1

FIG. 23

UPON SUCCESSFUL COMPLETION OF NAVIGATION BETWEEN TWO
LOCATIONS, OPTIONALLY ADD A NEW EDGE TO THE DIRECTED GRAPH
2802

UPDATE CONFIGURATION INFORMATION (E.G., TRANSITION
INFORMATION)
2804

PERFORM MAINTENANCE ON THE GRAPH AT ANY TIME (E.G., BY
REMOVING PATHS, ADDING JUNCTURE POINTS, ETC.)
2806

MODIFY 3D POINT CLOUD AT ANY TIME (REMOVE INDICES, ADD
INDICES, ETC.)
2808

HYBRID-APPROACH FOR LOCALIZATION OF AN AGENT

BACKGROUND

A variety of mechanisms have been proposed which allow an agent, such as a robot, to determine its location within an environment and to navigate within that environment. In an approach referred to as Simultaneous Localization and Mapping (SLAM), the agent builds a map of the environment in the course of navigation within that environment. In the SLAM approach, the agent may receive information from various sensors, including visual sensors. However, there remains room for considerable improvement in known localization and navigation mechanisms.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

The subject innovation relates to systems and methods for performing localization and navigation within an environment using a hybrid approach. In the approach, the agent (or some other entity) generates a directed graph which represents the environment. The directed graph includes nodes that represent locations within the environment and edges which represent transition paths between the locations. Further, a three-dimensional (3D) point cloud is generated using image and depth data about the environment. The directed graph need not represent features within the physical environment in a literal (e.g., metric-accurate) manner. However, the 3D point cloud does represent features of the environment in a metric-accurate manner.

An embodiment provides a location system in which a processor is configured to implement location modules for an agent. The modules include a belief determination module configured to determine a probabilistic belief associated with an extent to which the agent is associated with a predicted location on a directed graph. A comparison module is configured to compare the predicted location with a three dimensional (3D) point cloud to obtain a metric-accurate location for the agent.

Another embodiment provides a method for identifying a location of the agent. The method includes obtaining an input image of an environment from a sensor on the agent. The input image is compared with a collection of graph images associated with a directed graph to produce an observation. The directed graph represents a topological representation of the environment. A probabilistic belief for a predicted location is generated based, at least in part, on the observation. The probabilistic belief corresponds to a likelihood that the agent is associated with an actual location in the directed graph. The predicted location is compared to a portion of a three dimensional (3D) point cloud to determine a metric-accurate location for the agent, wherein the portion is selected based, at least in part, on the probabilistic belief.

Another embodiment provides a non-volatile computer readable medium for storing computer readable instructions. The computer readable instructions provide a location system when executed by one or more processing devices and include logic configured to receive an input image provided by an agent within an environment. The computer readable instructions also include logic configured to compare said at least one input image with a plurality of images associated with a directed graph to produce a probable location for the agent. The computer readable instructions also include logic configured to compare an image associated with the probable location to a three dimensional (3D) point cloud to generate a metric-accurate location, wherein the 3D point cloud comprises a metric map of the environment.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8 is a drawing of two different depth images (A) and (B), showing a shift in features as an agent moves through an environment.

FIG. 23 is an example of a translation table.

FIG. 28 is a block diagram of a method for updating a graph, which may be performed by the agent of FIG. 1.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

Many navigation and location mechanisms have attempted to build a map of the environment that accurately reflects the actual distances between features in the physical environment. Such a map is referred to as a metric-accurate map. However, many of these approaches are complex and provide unsatisfactory performance.

Embodiments disclosed herein set forth a hybrid approach for determining a location of an agent, such as a robot, within an environment using a probabilistic topological approach in concert with a three dimensional point cloud. The three dimensional (3D) point cloud represents a metric-accurate map of the environment, which is generated from images collected during the agent's exploration of the environment. Embodiments also provide functionality for performing navigation within the environment using the hybrid approach.

The hybrid approach allows a potentially large physical space to be compressed in the form of a directed graph, in which edges are paths and nodes are locations. A fast image comparison pipeline produces observations for each location and path, which can be used to probabilistically locate the agent in the environment and select a portion of the 3D point cloud for comparison. The agent can then be localized within the 3D point cloud, or metric-accurate map, using the same features utilized for image matching in the probabilistic location. The 3D point cloud is generated from the images captured for the directed graph and may also be built incrementally while navigating. The 3D point cloud can be used in real time to improve the accuracy of the visual matching for determining the probabilistic location and also to localize the agent within the full 3D point cloud, or metric-accurate map. This may allow additional navigation functionality, such as leaving one location on the directed graph to proceed directly to another location, without having to follow an edge. Further, it may allow an agent to move from a first edge to a proximate edge without having to move through a node connecting the two edges.

The disclosure is organized as follows. Section A describes an embodiment of an agent that incorporates the functionality summarized above. Section B describes methods which can be used in the operation of the agent. Section C describes a system that can be used to implement any aspect of the features described in Sections A and B.

Figure 29:
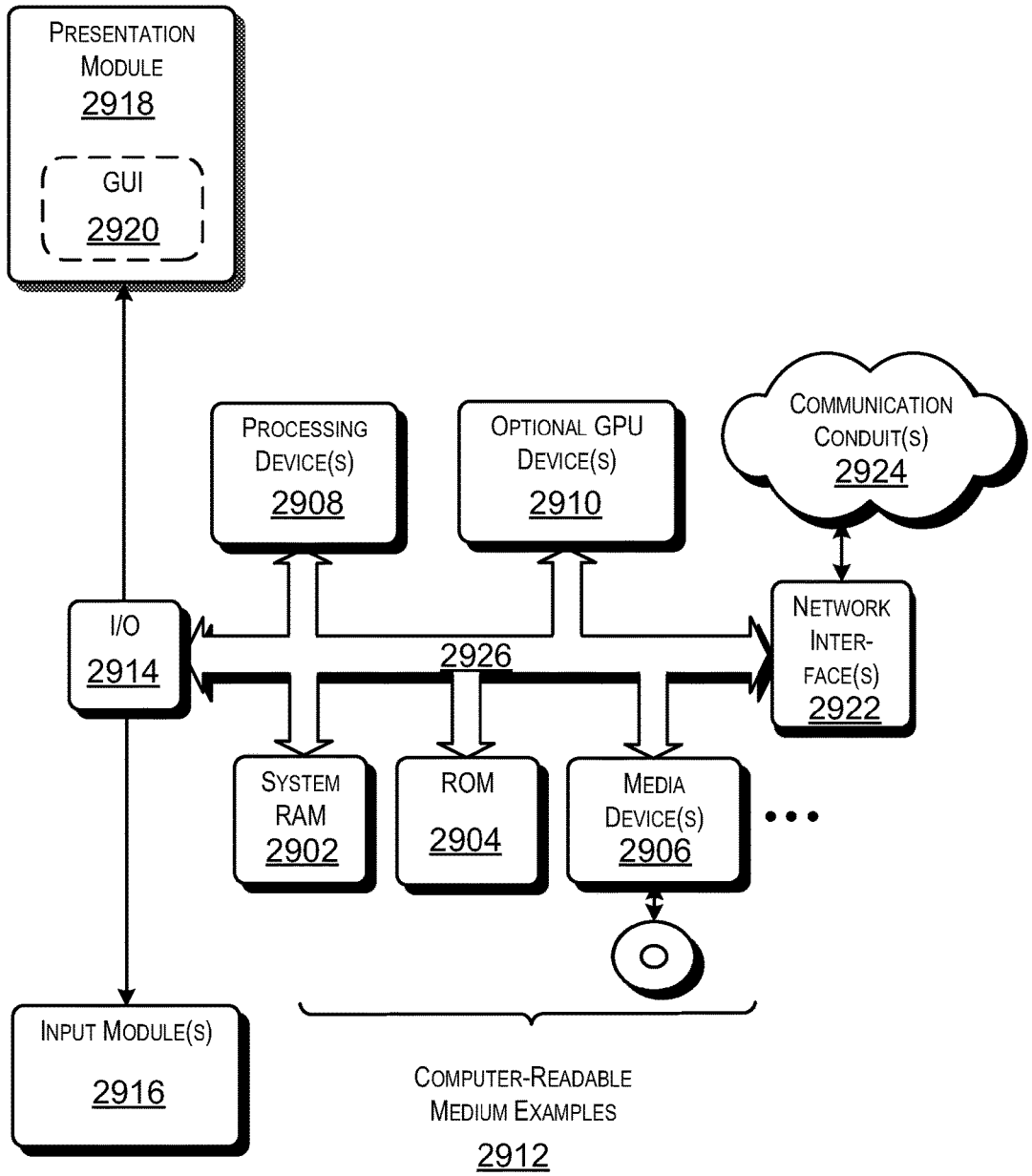
FIG. 29 is a block diagram of a system 2900 that can be used to implement the computing functionality for an agent 100, such the modules described with respect to the previous figures.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 29, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

A. Overview of an Illustrative Agent

Figure 1:
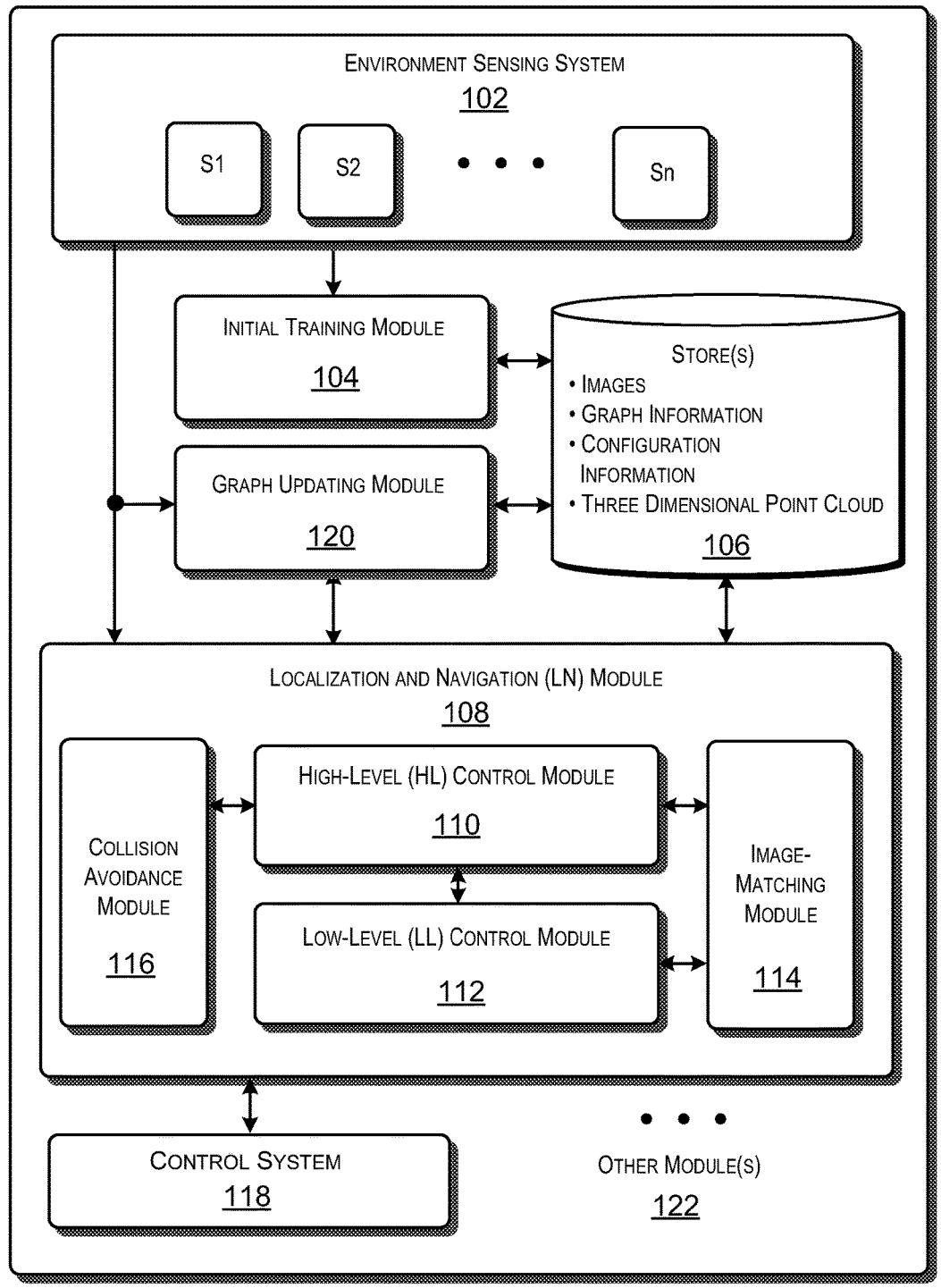
FIG. 1 is a block diagram of an agent for performing a hybrid-based localization and navigation within an environment.

FIG. 1 is a block diagram of an agent 100 for performing a hybrid-based localization and navigation within an environment. In one case, the agent 100 corresponds to any type of robot or automated vehicle for performing any task in any context. For example, such a robot or automated vehicle can be used in consumer applications, manufacturing applications, law enforcement applications, scientific applications, and so on. In another case, the agent 100 may correspond to a device that can be carried by a human, worn by a human, or otherwise operated by a human. For example, the agent 100 may correspond to a location-finding device that identifies a probable location of a human within an environment. For example, such a device may be used to assist sight impaired persons in navigating through an unfamiliar environment.

Further, as used herein, the term "environment" should be liberally construed. In one case, the environment may correspond to an indoor setting, such as a house, an apartment, a manufacturing plant, and so on. In another case, an environment may correspond to an outdoor setting of any geographic scope.

The agent 100 operates by probabilistically determining its location using a directed graph in concert with a three-dimensional point cloud. The three-dimensional point cloud makes up a metric-accurate map of the environment, and can be used to provide a metric-accurate location for the agent. To that end, the agent includes a sensing system 102 and an initial training module 104. The sensing system 102 includes one or more sensors (S1, S2, . . . Sn) for providing input information regarding the environment. The initial training module 104 can use the input information to construct a directed graph that represents the environment. As will be discussed below, the agent 100 can alternatively construct the directed graph based on information obtained from other sources. The initial training module 104 may also be used to create a 3D point cloud, representing a metric-accurate map of the environment.

The directed graph includes a collection of nodes that represent locations in the environment. The directed graph also includes a collection of edges that represent transition paths between the locations. In general, the directed graph represents the environment in a topological manner, rather than a metric-accurate manner. As such, there is no requirement that distances between the nodes in the directed graph represent actual distances among physical features in the environment.

The 3D point cloud can be considered to be a set of vertices in a 3D coordinate system. The vertices may be defined by x, y, and z coordinates and may represent objects in the environment, such as walls, floors, ceilings, and furnishing, among others. Unlike the directed graph, the 3D point cloud represents a metric-accurate map of the environment, which may be used in tandem with the direct graph to generate a more precise localization of the agent. As described herein, the 3D point cloud may be a one-dimensional matrix of indices, wherein each of the individual values for an index represents a location in 3D space.

The initial training module 104 can store input information and graph-related information in a store 106. Additional details will be provided below regarding the operation of the initial training module 104, e.g., in connection with FIGS. 3-9.

A localization and navigation (LN) module 108 performs two main tasks. First, the LN module 108 determines the location of the agent within the environment, starting with a probabilistic determination. In the probabilistic determination, the LN module 108 generates a plurality of probabilistic belief ("beliefs") that identify the likelihood that the agent is associated with different locations identified in the directed graph. This means that, at any given time, the LN module 108 can identify the location of the agent using a probability density function, rather than specifying the physical coordinates (e.g., Cartesian coordinates) of the agent 100 within the environment. Further, the LN module 108 can use probabilistic techniques to assess the location of the agent along a particular transition path. Once the probabilistic determination is made, the LN module 108 can compare the predicted location to the 3D point cloud to determine a metric-accurate location for the agent. Thus, after the use of the 3D point cloud to refine the probabilistic location determination, the location of the agent may be specified in physical coordinates in the environment, i.e., as a metric-accurate location.

Second, the LN module 108 can allow the agent 100 to navigate through the environment based both on its probabilistic assessment of location and the metric-accurate location. To this end, the LN module 108 includes a high-level (HL) control module 110 and a low-level (LL) control module 112.

The HL control module 110 identifies a plurality of votes for different respective locations within the directed graph. The votes make different respective recommendations for actions to be taken, based on the "perspective" of different locations in relation to a destination location being sought. The HL control module 110 modifies the votes by the above-described probabilistic beliefs (and, in some cases, cost information) to provide weighted votes. In one navigation procedure, the HL control module 110 then selects an action based on a consideration of the weighted votes. Illustrative actions include "do nothing" (in which the agent 100 takes no action), rotate (in which the agent 100 rotates in place at a particular location), navigate (in which the agent 100 navigates along a transition path), and explore (in which the agent 100 moves throughout the environment without regard to a destination location).

In another navigation procedure, the probabilistic beliefs can be used to select a portion of the 3D point cloud for comparison with a predicted location in order to generate a metric-accurate location. Among other uses, the metric-accurate location may be used to strengthen the probabilistic beliefs about the current position, for example, by allowing the agent to discard false-positive matches. Further, the metric-accurate location may be used to add additional navigation actions, such as "proceed to destination," in which the agent uses the metrically accurate location to progress directly towards a target location without following an edge, avoiding obstacles as needed. Additional details will be provided below regarding the operation of the initial HL control module 110, e.g., in connection with FIGS. 10-12.

The LL control module 112 executes a navigate action, if that action is chosen by the HL control module 110. In doing so, the LL control module 112 can determine, in a probabilistic manner, an offset between a current input image and a collection of images associated with an edge in the directed graph. The LL control module 112 can then use the offset to advance the agent 100 along a transition path associated with the edge. The LL control module 112 can also be used to determine a location offset between a current metric-accurate location and a target location. The location offset may then be used to advance the agent 100 directly towards the target location. Additional details will be provided below regarding the operation of the LL control module 112, e.g., in connection with FIGS. 13-16.

In performing the above-described tasks, the LN module 108 may rely on an image matching module 114. The image matching module 114 assesses the similarity between an input image and any image associated within the directed graph, referred to herein as a graph image. The imaging matching module 114 can perform this matching operation using any technique. For example, the imaging matching module 114 can identify features associated with the input image and determine the extent to which these features match features associated with a graph image.

In one non-limiting example, the image matching module 114 can use the image matching technique described in co-pending and commonly assigned U.S. application Ser. No. 12/435,447, entitled "Efficient Image Matching," filed on May 5, 2009, naming Georgios Chrysanthakopoulos as inventor. In that approach, matching is performed by first comparing one or more global signatures associated with the input image within global signatures associated with a collection of previously stored images. This fast comparison produces a subset of previously stored images that are possible matches for the input image. The approach then performs matching on a higher granularity by comparing features within the input image and features within the subset of previously images. However, any other image matching algorithm can also be used, such as a standard Harris-type feature comparison algorithm without the use of global signatures, and the like.

Further, the image matching module 114 may extract features from one or more currently collected images for comparison with the 3D point cloud. The comparison may be used to identify the present location on a metric-accurate map. In this procedure, the images that have the smallest error after comparing their features and signatures are selected, and the 3D pose (position and orientation) of one image in respect to the current portion of the 3D point cloud is estimated. Any matches that are not geometrically possible are discarded. This improves accuracy and speeds up further visual matching by eliminating feature comparisons between features that are too far apart in 3D space.

For the current image seen by an agent to match a location in the current portion of the 3D point cloud, the orientation of the features in the recalled portion of the 3D point cloud, relative to the current image, has to be similar across all features. For example, all features need to be shifted by N degrees to the right or left, or up or down. Further, the rotation should be physically possible given the degrees of freedom of the agent. As an example, a wheeled robot can only move on a two-dimensional (2D) plane, so any rotations up or down are invalid and a match to the 3D point cloud requiring those types of rotations can be discarded. The difference in depth, i.e., the Z-axis, in the 3D position between matched features needs to be within a certain margin, with outliers discarded.

Finally, the different in physical height of the 3D position between matched features of the current image and the 3D point cloud should once again be in a certain range, which is usually very narrow for robots constrained on 2D plane. In other words, since a robot generally will not move on a vertical axis, the difference in height may be about +/−5 cm to account for vibration and slight elevation changes, such as moving from carpet to tile, and the like. In other embodiments, the difference may be around +/−2 cm, for low vibration environments, or around +/−10 cm for high vibration environments, such as factory floors.

The LN module 108 also interacts with a collision avoidance module 116. The collision avoidance module 116 receives input information, such as depth-related information, from the sensing system 102. Based on this input information, the collision avoidance module 116 determines the presence of obstacles in the path of the agent 100. The LN module 108 uses information provided by the collision avoidance module 116 to govern the movement of the agent 100 so that it does not collide with the obstacles. The LN module 108 may also use the metric-accurate position determined using the 3D point cloud to avoid obstacles, for example, steering around obstructions on the metric-accurate map during a "proceed to destination" action.

A control system 118 receives actuation instructions from the LN module 108. The control system 118 uses these instructions to govern the movement of the agent 100. For example, the control system 118 may use the instructions to control one or more motors that are used to move the agent 100 along a desired path.

A graph updating module 120 is used to modify the directed graph and associated configuration information on an ongoing basis. The graph updating module 120 allows the agent 100 to learn or update its environment in the course of its use. For example, the graph updating module 120 can add edges to the directed graph in response to instances in which the agent 100 has successfully navigated between locations in the environment. In addition, or alternatively, the graph updating module 120 can modify configuration information based on navigation that it has performed. The graph updating module 120 can prune redundant information within the directed graph or make other maintenance-related modifications. Further, the graph updating module 120 can add new juncture points to the directed graph.

The graph updating module 120 can perform other modification-related tasks. For example, the graph updating module 120 may be used to update the 3D point cloud, for example, if items in the environment have moved after an initial training. This may be performed if the localization information for the agent matches to a certain point, then fails to match image information past that point. Additional details will be provided below regarding the operation of the graph updating module 120, e.g., in connection with FIGS. 15-16.

Finally, FIG. 1 indicates that the agent 100 can include other modules 122, to provide additional functions. For example, the agent 100 can include charging functionality that allows it to be recharged when it is coupled to a charging station. The agent 100 can automatically navigate to the charging station based on a beacon signal, such as a radio frequency beacon signal transmitted by the charging station.

Figure 2:
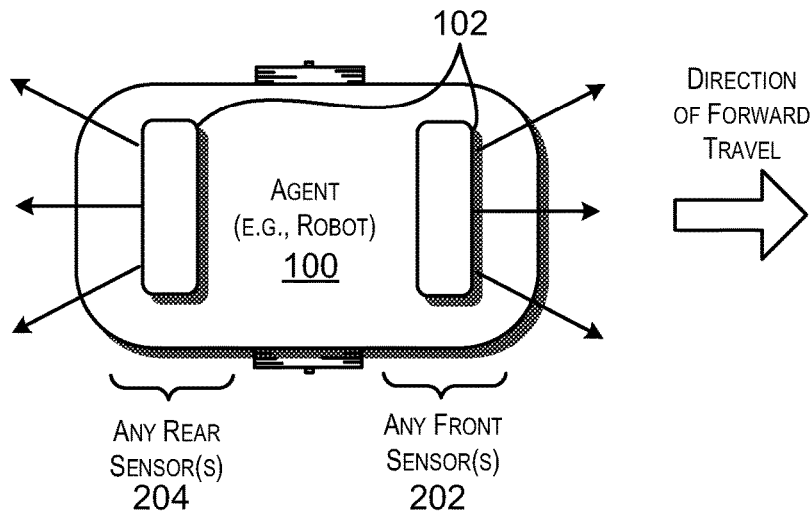
FIG. 2 is a schematic of the sensing system of the agent.

FIG. 2 is a schematic of the sensing system of the agent 100. In this figure, the agent 100 corresponds to a robot which moves in an environment using wheels powered by one or more motors. However, this type of agent 100 is merely representative. Other types of agents can use other means of locomotion, including a human carrying the agent through the environment. Similarly, the sensing system 102 is merely representative of one of many different types of sensing systems that can be used by an agent 100.

The sensing system 102 collects input information using one or more sensors. In one embodiment, the sensors can collect the input information at fixed temporal intervals. Alternatively, some or all of the sensors may provide input information on an event-driven basis. The input information can include images having any resolution, size, formatting, chromatic content, and the like.

The sensors can use different sensing mechanisms to receive information from the environment. For example, a first type of sensor can provide visual images in a series of corresponding frames. A second type of sensor can provide depth-related images or information, e.g., using an infrared mechanism, a stereoscopic visual mechanism, and the like. The depth information reflects distances between features in the environment and the agent 100. A third type of sensor can receive a beacon signal or the like, e.g., using a radio frequency mechanism. A fourth type of sensor can receive sound information. The sensors may also include other types of sensing mechanisms. To facilitate discussion, the input information provided by any sensor or collection of sensors at an instance of time is referred to herein as an image. In the case of a visual sensor, the image may correspond to a two-dimensional array of visual information, defining a single frame.

The agent 100 may arrange the sensors to receive different fields of view. In one example, the agent 100 can include one or more front sensors 202 which capture a front field of view of the agent 100. In other words, this field of view is pointed in the direction of travel of the agent 100. The agent 100 can also include one or more back sensors 204 which capture a back field of view of the agent 100. This field of view is generally pointed 180 degrees opposite to the direction of travel of the agent 100. The agent 100 may employ other sensors in other respective locations. In one embodiment, the front sensors 202 can receive a front visual image and a front depth image, while the back sensors 204 can receive a back visual image.

The agent 100 can link together different types of images that are taken at the same time. For example, at a particular location and at a particular instance of time, the sensing system 102 can take a front image, a back image, and a depth image. The agent 100 can maintain these three images in the store 106 as a related collection of environment-related information.

The image matching module 114 can process linked images in different ways depending on different contextual factors. For example, if the agent 100 may provide only a single input image of any type for a particular location. Having no other information, the image matching module 114 can use this lone image in an attempt to identify matching graph images that have been previously stored or in an attempt to identify the location in the 3D point cloud.

Further, the agent 100 may provide both a front visual image and a back visual image at a non-edge location (or node) within the environment, such as a bedroom within a house. Here, the imaging matching module 114 uses the front image to identify one or more matching graph images, with associated matching confidences. The image matching module 114 also uses the back image to identify one or more graph images, with associated matching confidences. The image matching module 114 can then decide to use whichever input image produces the matching graph images having the highest suitability (e.g., confidence) associated therewith. Once a sufficiently high confidence has been reached, the image matching module 114 may identify a portion of the 3D point cloud for comparison with the current image. This comparison may be used to determine a metric-accurate location for the agent.

As another example, the agent 100 may provide a front visual image and a back visual image corresponding to a location along a transition path. Here, the image matching module 114 again uses the front image and the back image to generate respective sets of matching graph images. But here the image matching module 114 may be configured to favor the use the back image during a training phase. In the training phase, the human user may be partially obstructing the field of view of the front image. Hence, even if the front image produces matching graph images of high confidence, the image matching module 114 may select the back image over the front image. Different applications can adopt different rules to define the circumstances in which a back image will be favored over a front image.

As another example, the agent 100 provides a depth image in addition to either the front image or the back image, or in addition to both the front image and the back image. In one embodiment, an input depth image can be compared to other pre-stored depth images associated with the directed graph. The input depth image and/or its matching pre-stored depth images also convey information when considered with respect to visual images that have been taken at the same time as the depth images. In another example, the depth image can be used to create the 3D point cloud.

The image matching module 114 can use a complementary depth image as a validity check on the matching graph images identified using any visual image. For example, assume that the image matching module 114 uses a visual image to identify a matching graph image associated with location X, but the depth information reveals that the agent 100 is unlikely to be in the vicinity of location X. The image matching module 114 can therefore use the depth information to reject the matching graph image associated with location X. In its stead, the imaging matching module 114 can decide to use another matching graph image which is more compatible with the depth information. This other matching graph image can be selected based on a visual image (front and/or back), as guided or constrained by the depth information. The matching graph image can be selected based on an input depth image alone. Other types of input information can serve as validity check in the above-described manner, such as a Wi-Fi signal or the like that has different signal strength throughout the environment.

The depth image may also be used to create the 3D point cloud which may be used as a validation of the predicted location. The current predicted location may be used to select a portion of the 3D point cloud for comparison, lowering the processing used for the comparison. The current depth image may be processed to extract features and generated predicted rotations, which can then be compared to the 3D point cloud to obtain a location. If no match is obtained, the imaging matching module 114 can decide to use another image which is more compatible with the 3D point cloud.

The above framework for processing images of different types is representative and non-limiting. Other systems can use other rules to govern the processing of images of different types.

The image matching module 114 can compare visual images using one or more techniques. For instance, the image matching module 114 can compute one or more global signatures for an input image and compare the global signatures to previously-stored global signatures associated with images within the directed graph. A global signature refers to information which characterizes an image as a whole, as opposed to just a portion of the image. For example, a global signature can be computed based on any kind of detected symmetry in an image (e.g., horizontal, and/or vertical, etc.), any kind of color content in the image (e.g., as reflected by color histogram information, etc.), any kind of detected features in the image, and so on. In the last-mentioned case, a global signature can represent averages of groups of features in an image, standard deviations of groups of features in the image, and so on. The image matching module 114 may perform comparison on a more granular level by comparing individual features in the input image with features of previously-stored images.

The image matching module 114 can also compare depth images using various techniques. A depth image can be represented as a grayscale image in which values represent depth (with respect to an origin defined by the agent 100). In one example, the value 0 may represent zero distance and the value 255 can represent a maximum range, where the actual maximum range depends on the type of camera being used. Values between 0 and 255 an represent some distance between zero and the maximum range. In one case, the image matching module 114 can create a single row for a depth image, where each value in the row represents a minimum depth reading for a corresponding column in the image. This row constitutes a depth profile that can serve as a global signature. The image matching module 114 may take the horizontal and/or vertical gradients of the depth image and use the resultant information as another global signature. The image matching module 114 may apply any of the visual matching techniques described in the preceding paragraph for depth images. The image matching module 114 can rely on yet other techniques for comparing depth images; the examples provided above are non-exhaustive.

Figure 3:
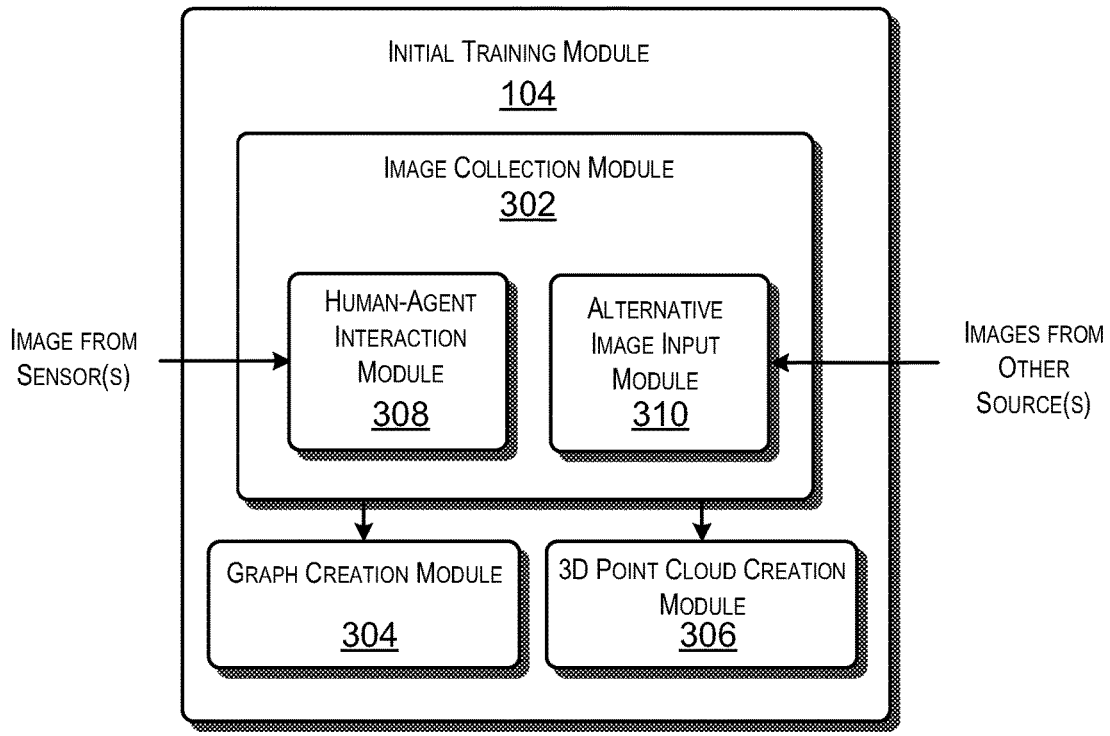
FIG. 3 is a more detailed block diagram of the initial training module of FIG. 1.

FIG. 3 is a more detailed block diagram of the initial training module 104 of FIG. 1. The initial training module 104 operates in a boot-up phase to learn the characteristics of the environment in which the agent 100 is to subsequently operate in a real-time mode. The initial training module 104 represents the characteristics of the environment using a directed graph having a collection of nodes and edges.

To perform its operation, the initial training module 104 can include an image collection module 302, a graph creation module 304, and a 3D point cloud creation module 306. The image collection module 302 receives images of the environment from the sensing system 102. The graph creation module 304 organizes the images collected by the image collection module 302 into the directed graph. The 3D point cloud creation module 306 takes sequential depth images and compares features to create the 3D point cloud, as discussed below.

Beginning with the image collection module 302, the agent 100 can learn its environment in different ways. To illustrate this point, FIG. 3 shows that the image collection module 302 may include a human-agent interaction module 308 and an alternative image input module 310. The human-agent interaction module 308 may allow a user to guide the agent 100 through an operating environment. In the course of this tour, the agent 100 captures images of different locations and transition paths between the different locations. During the approach described here, the agent 100 moves with suggestions from the user, while the user tags the paths and locations. The alternative image input module 310 may allow the agent 100 to receive a collection of images from any other source. For example, a user may manually take pictures of an environment in conventional fashion, e.g., using a still image camera, video camera, scanning camera, depth camera, and the like. The user may then group the pictures into folders associated with respective locations and folders associated with respective transition paths. Still other approaches can be used to obtain the images.

Another way to train the agent 100 is by allowing the agent 100 to explore the environment with no supervision, e.g., avoiding obstacles and moving towards areas were no data (depth points) exist. A user can then examine the captured images and associated maps generated from the 3D point clouds and tag them, e.g., give locations in the 3D point cloud a name. In contrast to the guided home tour, described above, this can be used to build the graph after the exploration.

Figure 4:
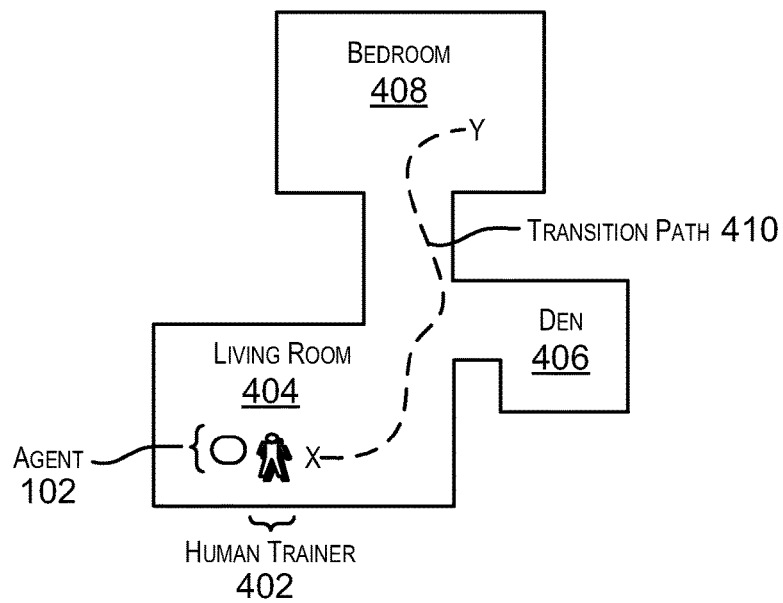
FIG. 4 is a drawing of an operating environment in which the agent can collect images.

FIG. 4 is a drawing of an operating environment in which the agent 100 can collect images. For example, this may be performed using the human-agent interaction module 308, with the assistance of a human trainer 402. In this representative case, the environment 400 may be a single-level apartment having a living room 404, a den 406, and a bedroom 408. This is a simplified scenario as the agent 100 can operate in environments of any degree of spatial scope and complexity.

The agent 100 in this scenario corresponds to a mobile robot of the type shown in FIG. 2. The agent 100 can include a radio frequency (RF) receiving device that detects a signal transmitted by an RF transmitting device carried by the human trainer 402. Using this coupling mechanism, the agent 100 can be configured to follow the human trainer 402 as he or she walks throughout the environment 400, e.g., by maintaining a prescribed distance behind the human trainer 402. Further, the agent 100 can include a voice recognition system for detecting and responding to spoken commands and the like. These mechanisms are merely examples as other implementations can use different ways to guide the agent 100 through the environment 400. In another example, the human trainer 402 can manually pull or push the agent 100 through the environment 400. In another example, the human trainer can send instructions to the agent 100, e.g., via wireless communication, which cause it to move throughout the environment 400. In this scenario, the human trainer 402 can issue the commands from a location within the environment 400 or from a location that is remote with respect to the environment 400.

In the particular illustration of FIG. 4, the human trainer 402 is in the process of walking from location X to location Y along a transition path 410. The transition path 410 is arbitrary in the sense that there are no constraints as to how the human trainer 402 may advance from location X to location Y. The human trainer 402 may walk in any direction and make any variety of turns, including even a U-turn or about-face that leads the human trainer 402 back towards the origin location X. During this process, the agent 100 can be configured to take images at regular intervals of time.

In one approach, when the human trainer 402 reaches a node location, such as X, Y, or the like, he or she can speak the name of that location. For example, upon reaching the living room 404, the human trainer 402 can speak the phrase "living room." Upon receiving this information using a voice recognition system, the agent 100 can be configured to organize all images taken at this location under a label of "living room." Upon reaching the bedroom 408, the human trainer 402 speaks the word "bedroom." This informs the agent 100 that it will now be collecting images associated with the bedroom 408. The agent 100 can associate any images taken in transit from the living room 404 to the bedroom 408 with the transition path 410, which it can implicitly label as "Living Room-to-Bedroom" or the like. Alternatively, the human trainer 402 can explicitly apply a label to the collection of images taken along the transition path 410 in the manner described above.

There are no constraints on how many node locations that the human trainer 402 may identify within the environment 400. Further, there are no constraints regarding what features of the environment that the human trainer 402 may identify as node locations. For example, the human trainer 402 can create multiple node locations within the living room 404, e.g., corresponding to different parts of the living room 404. The portions of the 3D point cloud corresponding to the node locations and transitions may be labeled by the initial training module 104 in a similar fashion, so that a probabilistic identification of a location in a node may result in the use of the 3D point cloud for further localization.

Figure 5:
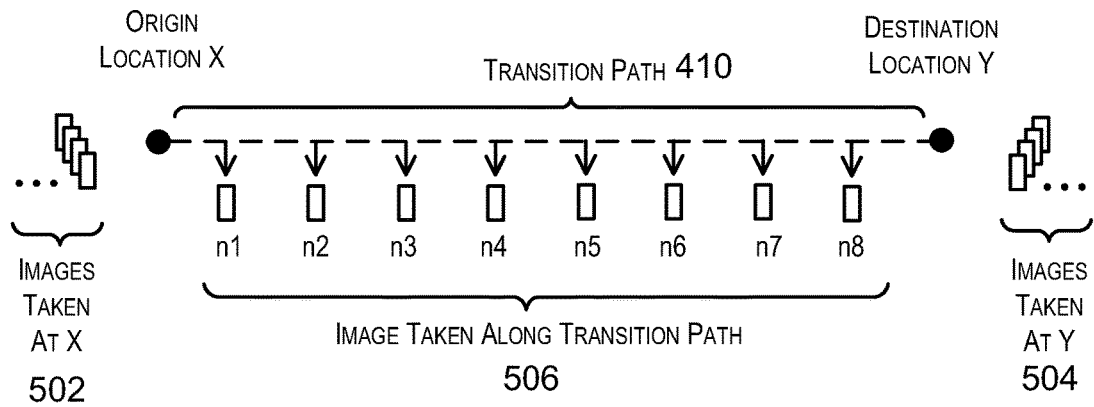
FIG. 5 is a schematic of images captured by the agent within the environment.

FIG. 5 is a schematic of images captured by the agent 100 within the environment. The images include a first collection of images 502 taken at location X, e.g., of the living room 404. The images include a second collection of images 504 taken at location Y, e.g., of the bedroom 408. Finally, the images include a third collection of images 506 taken along the transition path 410 leading from location X to location Y. The first collection of images 502 and the second collection of images 504 may organize their images in any order. The third collection of images 506 arranges its images according to an order in which these images were taken. This ordering can be represented by sequence numbers assigned to the images, e.g., n1, n2, etc. In one case, the sequence numbers may represent timestamps associated with the images at the time of their capture.

Figure 6:
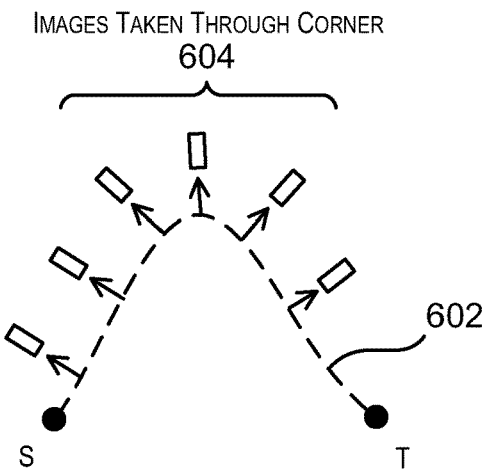
FIG. 6 is a schematic of a series of images taken at regular intervals over a transition path that includes a turn.

FIG. 6 is a schematic of a series of images taken at regular intervals over a transition path 602 that includes a turn. The agent 100 may reduce its speed as it navigates through this turn, e.g., due to the natural dynamics involved in making such turns. As a consequence, the agent 100 may take an increased number of images 604 over the course of the turn, compared, for example, to a straightaway portion of the transition path 602. This is caused when an agent 100 that is capturing images at fixed intervals has slowed its rate of advancement over the course of the turn. This aspect of the image collection process is potentially advantageous because the additional images provide additional guidance to the agent 100 when it seeks to navigate through the turn in a real-time mode of operation. In other words, the additional images reduce the chances that the agent 100 will become "lost" when navigating through this region.

Figure 7:
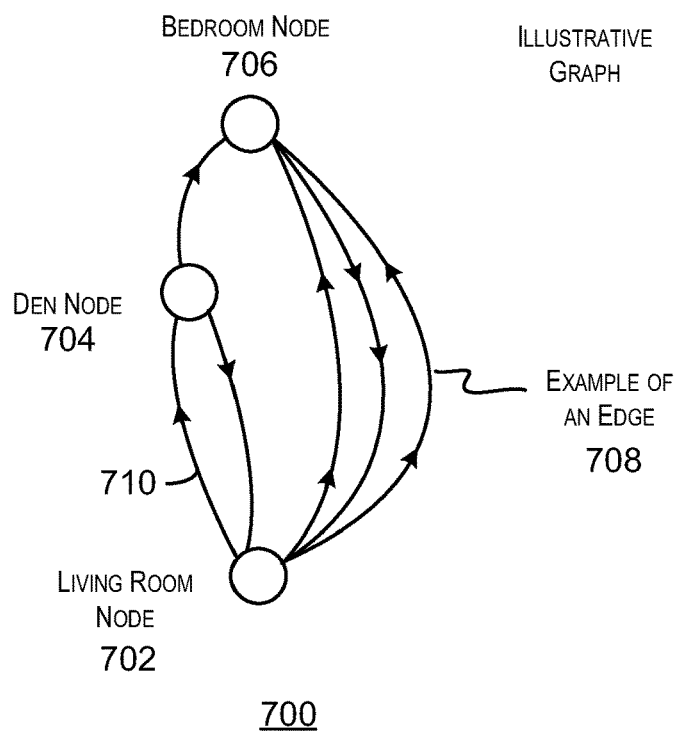
FIG. 7 is a drawing of a directed graph created by the initial training module.

FIG. 7 is a drawing of a directed graph 700 created by the initial training module 104. The directed graph 700 includes a node 702 associated with the living room 404, a node 704 associated with the den 406, and a node 706 associated with the bedroom 408. The directed graph 700 also includes a collection of edges that link together different nodes. For example, an edge 708 corresponds to the transition path 410 shown in FIG. 4. The edges are directed, meaning that they point from one node to another node associated with a direction of travel from one location to another location. The directed graph 700 can accommodate multiple edges between the same pair of nodes. For example, two edges connect the living room node 702 to the bedroom node 706. These two edges may correspond to two collections of images collected over two spatially distinct transition paths. Alternatively, or in addition, the two edges may reflect two collections of images obtained over the same transition path under different environmental conditions, such as different lighting conditions, or different floor surface conditions, or different clutter conditions, and so on. The agent 100 itself maintains an agnostic approach as to the underlying characteristics of transition paths associated with the edges. For example, an edge may have a certain cost associated therewith in a certain navigational context, but otherwise, the agent 100 may be unaware of or indifferent to the underlying fact that the edge may represent an idiosyncratic way of reaching a particular location. That is, the agent "sees" the edge as simply a sequence of images that lead from point X to point Y.

The collections of images may also be used to generate the 3D point clouds for each of the nodes and transitions. The 3D point clouds may provide confirmation of a predicted location, or may be used to provide a more efficient path to a destination. In other words, the agent 100 may be able to use the metric-accurate map provided by the point cloud to determine if a more efficient route exists to reach a destination. This determination may then be used by the agent 100 to jump from one edge 708 to another edge 710 if a more efficient path exists.

By way of terminology, the agent 100 is said to be related to a destination node via a single-hop path if the agent 100 can reach the destination node via a single edge. The agent 100 is said to be related to a destination node via a multi-hop path if the agent 100 can reach the destination node only via two or more edges in the directed graph 700.

As a final point with respect to FIG. 7, it can be noted that the directed graph 700 is a topological representation of the environment 400, rather than a metric-accurate representation of the environment 400. Hence, the directed graph 700 need not, and generally does not, represent the physical relationship of locations within the physical environment 400. In contrast, a 3D point cloud, as discussed below, is a metric-accurate map of the environment and may be used to determine a metric-accurate location for the agent 100.

FIG. 8 is a drawing 800 of two different depth images (A) and (B), showing a shift in features as an agent moves through an environment. This shift or difference between images may be used to generate a 3D point cloud. For example, a 3D point cloud may be generated for each captured image and then stitched into one global 3D point cloud for the entire environment.

As used herein, a feature is an individual location within the environment, such as a point on a leg of a chair, a point on a wall, and the like. A collective feature is a single item in the environment. As shown in the illustration 800, a number of collective features may be recognized, including, for example, stools 802, chairs 804, an exit door 806, and walls 808, in front of the stools 802. For reference, the collective features are similarly labeled in 3D point clouds shown in FIGS. 9-12. Further, as noted above, node locations may be assigned to names. In the illustration, the view may encompass a room termed the "living area" and labeled as (L) in FIGS. 8-12. Other rooms may be labeled as shown in FIGS. 9-12.

The approach for generating the 3D point clouds, described herein, does not use a global grid and, thus, avoids the associated increased memory requirements needed for good accuracy. Instead, using the fact that images correlated in time, e.g., captured close to each other, usually share a substantial number of features, a pairwise comparison between images may be performed. For example, a sequential comparison may be made of a first image (A) to second image (B), wherein image (A) is captured at time N and image (B) is captured at time N+t, in which t is the sampling interval. For example, t may be greater than about a tenth of a second.

Thus, to create a 3D point cloud for a sequence of N images an iterative algorithm can be sequentially applied to each two sequential images in the sequence, such as image (A) and image (B). First, N sets of alternative 3D positions can be created for each feature in image (A), which may be considered the reference image. Each set is essentially a trial pose of image (A). For example, the features in image (A) can be translated 0.5 m on the Z axis and every feature rotated 30 degrees on the Y axis. This creates a small search space 'f' of candidate poses that are then compared with the features in image (B).

For each candidate pose and its associated N features, a dictionary (e.g., a key→value map) is built using an index to describe the location of the 3D feature, given some resolution and range in each physical dimension. Instead of using a pre-allocated grid, a KD-tree, or other data structures, the physical 3D position is converted to a single number. As an analogy, this is similar to how a pixel drawn on a two-dimensional (2D) image can be indexed in memory: index=rowSize*y+x. In the present case, the space is in 3D, so we need to index a 3-dimensional array. In some embodiments, a 3D position that can be described by the tuple of coordinates (x,y,z), in meters, is converted to an index using the following procedure. Thus, a two way function is provided that takes a 3D coordinate, in meters, and produces an integer index value. The reverse is also possible, e.g., from an index to a quantized 3D position.

To create the index, some resolution may be used to quantize the metric space, for example, about 5 cm. Thus, a position (1,0,2) in a 3D space may become 20,0,40 (in units of 5 cm each). These units may be used to create an imaginary XY plane (rows and columns) based on the physical dimensions the index can address. For example, if we want to have an index that can deal with a house that is 30 m by 30 m by 2 m in height, the dimensions can be converted to units appropriate for the resolution. For a 5 cm resolution, the resulting index will address a 3D space of 30/0.05=600,40,600 units. In this example, the XY plane is 600*40 in size.

Accordingly, a value is computed for sizeOfXYPlane= (rangeX*resolution)*rangeY. Next, a value is computed for sizeOfXRow=rangeX*resolution. A value is computed for Size of Z plane=(rangeZ*resolution). For each of the three coordinates a scaledPoint value is computed by scaledPoint=(x,y,z)*resolution. Finally, the value is computed for the index number by Index=scaledPoint.Z*sizeofXYPlane+ scaledPoint.Y*sizeOfXRow+scaledPoint.X*x. The dictionary for the candidate pose is then populated with the indices generated, creating a one-dimensional matrix listing the feature locations.

Similarly, each feature in image (B) is analyzed to generate a list of indices of 3D features. Each index value for a feature in image (B) is compared to the dictionary to see if it is already present. As used herein, "present" indicates that an index value matches a previously created index value within a predetermined range. For example, an index value may be considered to match a previously created value if it is within about 1% of the previously created value. In other example, an index value may considered to match if it within about 5% of the previously created value. Other ranges may be used in higher vibration environments, such as a factory floor or a user carried device. If the values match within the range, a counter, called featureMatchCount, is incremented. The candidate pose of image (A) that has the highest value for featureMatchCount is selected for addition to the 3D point cloud.

For increased accuracy and to remove transient features a second pass through the environment may be performed to refine the global dictionary of features. Using this procedure, features that were present on only a few images can be removed, leaving persistent features, like those belonging to walls. This may be useful to eliminate index values caused, for example, by people standing in the view of the robot for some of the sensor samples, but then walking away. This allows the procedure to be used in highly dynamic environments. Other changes, such as shifts in the positions of furniture, may be handled by the graph updating module 120, described with respect to FIG. 1.

An initial 3D point cloud is built during an initial 360 rotation at the starting position, before starting navigation. This initial 3D point cloud can be compared this with the point clouds generated for each location in the graph. The initial 3D point cloud provide an additional localization observation, in addition to visual matching, and provides an anchors in metric space.

The end result of the process described above is a 3D point cloud from features found across all images in the sequence. From a top down view the 3D point cloud looks like a map, as can be seen in the top down views of FIGS. 9-12. Other views may also be generated, since the data is three-dimensional. Thus, the 3D point cloud inherently includes all relative poses that could exist between different images in the environment, such as the images n1-n8 along the transition path 506, discussed with respect to FIG. 5. Accordingly a comparison of an image to the 3D point cloud may provide a metric-accurate localization of the agent 100.

Figure 9A:
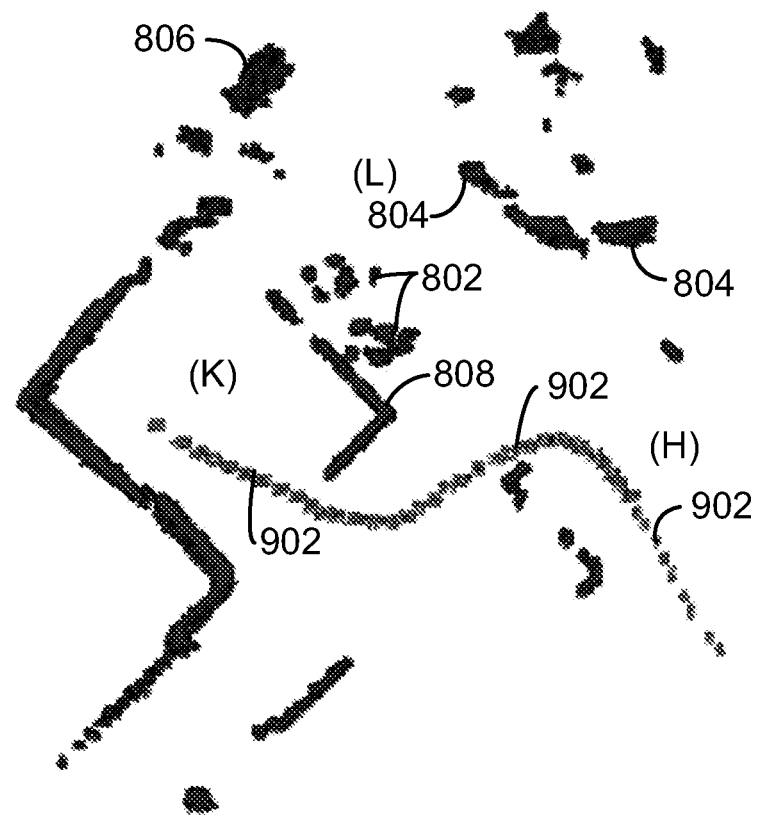
FIGS. 9(A)-(D) are top views of a three-dimensional point cloud created from a series of images of the environment of FIG. 8, illustrating a navigation of an agent through the environment.

FIGS. 9(A)-(D) are top views of a three-dimensional point cloud created from a series of images of the environment of FIG. 8, illustrating a navigation of an agent 100 through the environment. In FIG. 9(A), the agent location track 902 shows the agent moving between a hallway (H) and a kitchen (K), through a living area (L). The features, such as the stools 802, chairs 804, and walls 808, can be clearly seen as points in the 3D point cloud. Some fuzziness or point error can be seen for more movable features, such as the stools 802 and chairs 804, while more fixed features, such as the walls 808, are sharper in the point cloud.

Figure 9B:
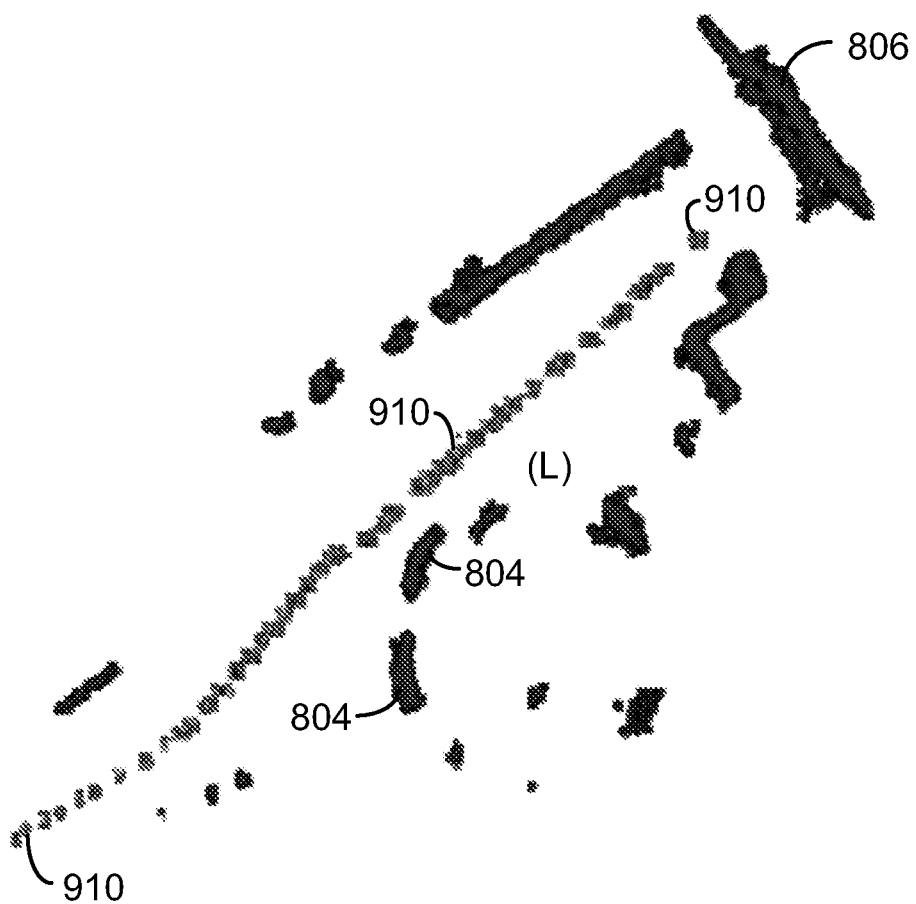

In FIG. 9(B), the agent location track 910 indicates that the agent 100 is moving in the living area (L) past the chairs 804 and in the vicinity of an exit door 806. The exit door 806 may also be fuzzy, for example, if the position of the door is changed between images or if outside temperature or lighting variations interfere with a sensor's determination of depth.

Figure 9C:
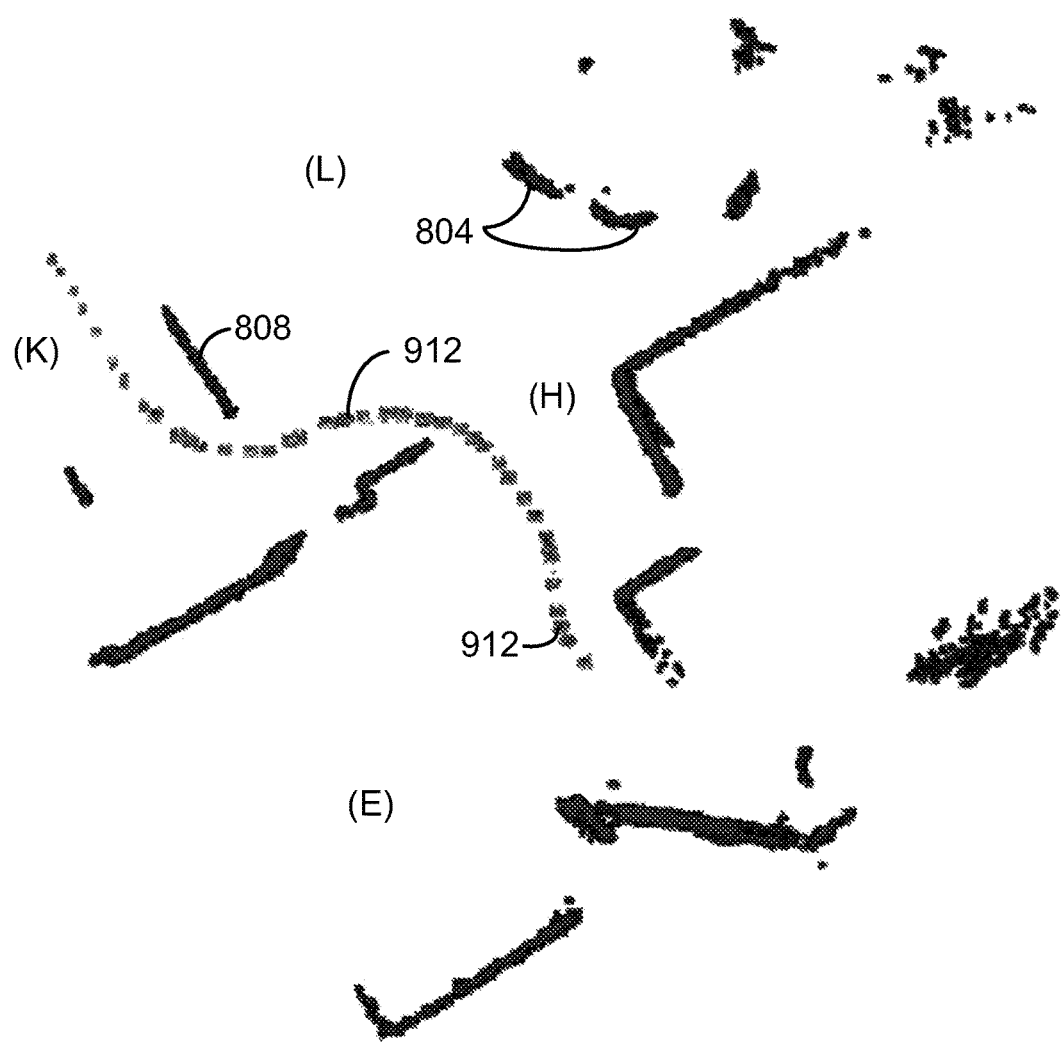
Figure 9D:

In FIG. 9(C), the agent location track 912 indicates that the agent 100 is moving between an entryway (E) and the kitchen (K), through a hallway (H) and the living area (L). In FIG. 9(C), the chairs 804 are sharper than in previous 3D point clouds, indicating that they may have been in fixed locations through a number of iterations of the agent 100 through the space. FIG. 9(D) is another portion of the 3D point cloud, showing a complete map of the entryway (E), including a door 914. In this case, no agent location track is shown, which may indicate that the agent 100 has reached a target destination, and is not moving pending further instructions.

The 3D point cloud can be used as a visual aid to the user, in order to tag locations at a finer granularity, such as projection spots, or for the robot to automatically associate physical spots in the environment where certain interesting events occur. It also aids in localization during real time navigation since the features from the current image may be associated with the most likely set of features in the point cloud. In this function, there is no need to search a large point cloud exhaustively, for example, if the agent 100 is moved abruptly from one location to another or is first powered on. The visual topological matching, using the directed graph, can quickly narrow the top N image candidates, identifying a portion of the 3D point cloud having the highest probability of matching the current image, e.g., probabilistic belief, and then match the current features against that portion of the point cloud to establish a metric-accurate location.

The metric-accurate map may allow for navigation that is based on the 3D point cloud, for example, allowing a "proceed-to-destination" command to be implemented. For example, a proceed-to-destination command may compare the current metric-accurate location to a target location and navigate to minimize the distance to the target location, avoiding obstacles during the navigation.

Figure 10:
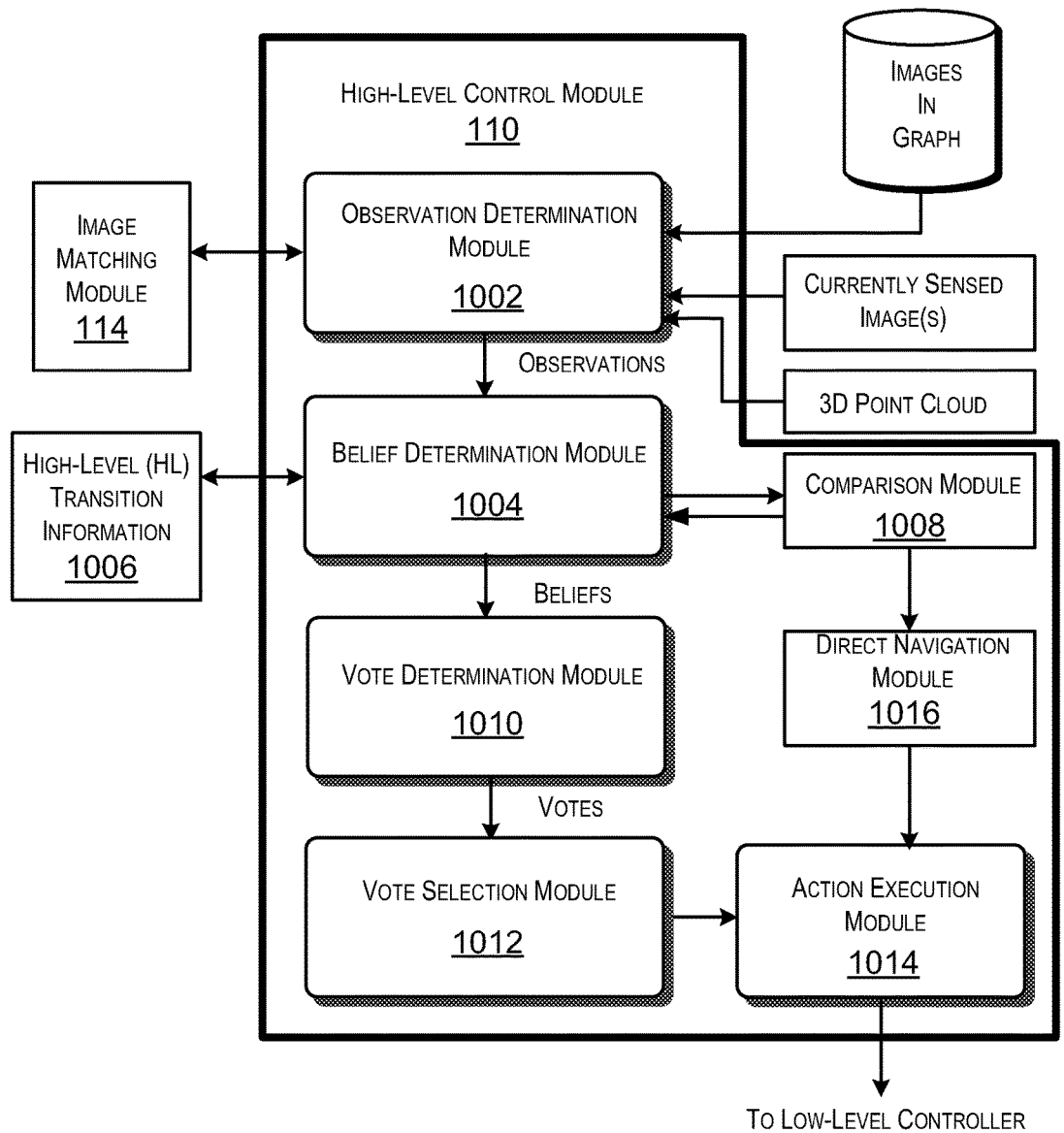
FIG. 10 is a block diagram of the high-level (HL) control module introduced in FIG. 1.

FIG. 10 is a block diagram of the high-level (HL) control module 110 introduced in FIG. 1. By way of overview, the HL control module 110 determines actions to be taken by the agent 100. In the course of this task, the HL control module 110 also determines the probabilistic location of the agent 100 and the metric-accurate position of the agent.

The HL control module 110 includes a collection of component modules. To begin with, an observation determination module 1002 receives one or more current input images from the sensing system 102 at a particular location. To simplify explanation, the following description assumes that the observation determination module 1002 receives a single input image at a particular location, which captures the appearance, depth, or some other aspect of the environment at that location. The observation determination module 1002 also interacts with graph images and the 3D point cloud that were generated in the set-up phase or at some later juncture as a result of the learning capabilities of the agent 100.

The observation determination module 1002 generates observations which reflect a level of initial confidence that the input image corresponds to a location within the directed graph 700. In the following explanation, the term "location" is used liberally to represent both node locations (e.g., the living room node 702, the den node 704, and the bedroom node 706) and various edges that connect the node locations together. As used herein, location also includes the more precise metric-accurate location determined from comparison of features in an image to the 3D point cloud. A metric-accurate location is a predicted location that is within a certain range of the actual location of the agent 100. For example, a metric-accurate location may be within 5 cm in all dimensions of the actual location, within 10 cm of the actual location, within 20 cm of the actual location, or within a meter of the actual location. Generally, as the agent 100 improves the accuracy of the 3D point cloud, the accuracy of the metric-accurate location will also improve.

The observation determination module 1002 performs this task using the image matching module 114, e.g., by assessing the degree of similarity between the input image and graph images associated with different locations in the directed graph 700. As a result of this operation, the observation determination module 1002 generates a list of the graph images which most closely match the input image. Because the graph images are associated with locations, this list implicitly identifies a list of possible graph locations that correspond to the input image.

However, the observations themselves are potentially noisy and may provide erroneous information regarding the location of the agent 100. To address this issue, the HL control module 110 can use the metric-accurate location determined from the 3D point cloud. The HL control module 110 can also use the belief determination module 1004 to generate probabilistic beliefs ("beliefs") on the basis of the observations (provided by the observation determination module 1002) and system dynamics, as expressed by high-level (HL) transition information 1006. More specifically, the belief determination module 1004 can use a Partially Observable Markov Decision Process (POMDP) to generate updated beliefs $b^{t+1}(l)$ as follows:

$$b^{t+1}(l) = p(O|l) \cdot \sum_{M}^{all\, locs} p(l|M, a) \cdot b^{t}(M). \quad (1)$$

In this equation, $b^{t+1}(l)$ represents the belief that the agent 100 is located at location l at sampling instance t+1. $p(O|l)$ represents the probability that an observation obtained by the observation determination module 1002 can be attributed to the location l. In practice, $p(O|l)$ may represent an image similarity score that assesses a degree of similarity between the current input image and the graph images associated with location l. $b^{t}(M)$ represents a current belief associated with a location M, expressing the probability that the agent 100 is associated with that location M. That is, the current belief $b^{t}(M)$ represents a belief that was calculated using Equation (1) in a previous sampling instance. $p(l|M, a)$ represents a probability (referred to as a transition probability) that the agent 100 will be found at location l given a location M and an action a that is being performed by the agent 100. Equation (1) indicates that the product $p(l|M,$ a)·$b^{t}(M)$ is summed over all locations M in the directed graph 700. Finally, the belief determination module 1004 performs the computation represented by Equation (1) with respect to all locations l in the directed graph 700.

Less formally stated, Equation (1) weights the probability $p(O|l)$ by the current system dynamics, represented by the sum in Equation (1). The system dynamics has the effect of de-emphasizing location candidates that are unlikely or impossible in view of the current operation of the agent. Hence, the system dynamics, represented by the sum in Equation (1), is also referred to as a filtering factor herein. The outcome of the operation of the belief determination module 1004 is a set of beliefs (e.g., updated beliefs) for different locations l in the directed graph 700. These beliefs reflect the likelihood that the agent 100 is associated with these different locations l.

The transition probabilities $p(l|M, a)$ defined by different combinations of l, M, and a are collectively referred to as the HL transition information 1006. As will be discussed further with respect to FIG. 23, the HL transition information 1006 can be expressed as a table. One axis of the table identifies different relations of location M to location l. Hence, the system dynamics implicitly takes into consideration the structure of the environment. Another axis of the table identifies different actions that the agent 100 can perform (e.g., "do nothing," rotate, navigate, and explore). The body of the table identifies different translation probabilities associated with different combinations of relations and actions.

The belief determination module 1004 may also interact with a comparison module 1008 that can analyze the input image or images with the highest probabilities to generate a list of indices for features. The indices may then be compared to the most likely portion of the 3D point cloud to establish a metric-accurate location. The comparison module 1008 may be part of the image matching module 114 or may be a separate functionality.

A vote determination module 1010 identifies different actions to be taken from the "perspective" of the different locations l in the directed graph 700. In other words, each location l can be viewed as an actor which assumes that the agent 100 is located at its location l. Based on this assumption, each location l recommends an action that is most appropriate to advance the agent 100 from the location l to a destination location that the agent 100 is attempting to achieve. In one representative implementation, possible actions include "do nothing" (in which the agent 100 takes no action), rotate (in which the agent 100 rotates in attempt to find an edge), navigate (in which the agent 100 navigates along an edge), and explore (in which the agent 100 "wanders" through the environment with no goal other than to find open space and avoid obstacles).

Thus, for example, node locations in the directed graph 700 (e.g., the living room node 702) will vote for either do nothing or rotate. More specifically, a node location will vote for "do nothing" if it corresponds to the destination node (since the agent 100 has already reached its destination and no action is needed). A node location will vote for rotate if does not correspond to the destination node (since it is appropriate for the agent 100 to find an edge over which it may reach the destination node). Node locations do not vote for navigate or explore because, in one implementation, edges are the only vehicles through which the agent 100 moves through the directed graph 700.

An edge location will vote for navigate, rotate, or explore. Section B will provide further details on the circumstances in which each of these votes is invoked. By way of overview, an edge location may vote for navigate if advancement along the edge is considered the most effective way to reach the destination location—which would be the case, for instance, if the edge directly leads to the destination location. An edge location may vote for rotate if advancement along the edge is not considered the most effective way to reach the destination location. An edge location may vote for explore if it is determined that the agent is operating within a stuck state (to be described below), meaning that it is not making expected progress towards a destination location.

In certain cases, an edge location may represent an edge that is directly connected to a destination location. In another case, an edge location may represent an edge that is indirectly connected to the destination location through one or more additional edges. To address this situation, an edge location may vote for a particular action based on an analysis of different ways of advancing through the directed graph to achieve a destination location. To facilitate this task, the vote determination module 1010 can rely on any graph analysis tool, such as the Floyd-Warshall algorithm. These types of tools can identify different paths through a directed graph and the costs associated with the different paths. In the present context, the cost may reflect an amount of time that is used to traverse different routes. There is also a cost associated with the act of rotation itself. Costs can be pre-calculated in advance of a navigation operation or computed during a navigation operation.

The vote determination module 1010 weights each vote by the beliefs provided by the belief determination module 1004. The weighted votes reflect the appropriateness of the votes. Thus, for example, a particular location may vote for rotate. However, assume that this location is assigned a very small belief value that indicates that it is unlikely that the agent 100 is associated with that location. Hence, this small belief value diminishes the appropriateness of the rotate action. Further, the comparison generated by the comparison module 1008 may be used to weight votes or even eliminate votes, for example, by setting the belief value very low for a location that does not fit the current comparison to the 3D point cloud.

A vote selection module 1012 selects one of the votes associated with one of the locations. The vote selection module 1012 may select the vote having the highest associated belief value. In certain cases, the vote selection module is asked to consider votes which reflect different possible paths to reach a destination location, including possible multi-hop routes that have multiple edges. In these cases, the vote selection module 1012 can also consider the cost of using different routes. Cost information can be provided in the manner described above.

An action execution module 1014 generates commands which carry out whatever action has been selected by the vote selection module 1012. Alternatively, using the 3D point cloud, a direct navigation sequence to a target destination may be implemented, for example, using the location provided by the comparison module 1008 to provide localization to a direct navigation module 1016. The direct navigation module 1016 could then issue commands to the action execution module 1014. If the agent is blocked from reaching the target destination directly, navigation control could return to the directed graph to follow edges to other nodes. The 3D point cloud comparison could also allow an agent to move from one edge in a directed graph to a proximate edge having a more efficient path to a destination.

Figure 11:
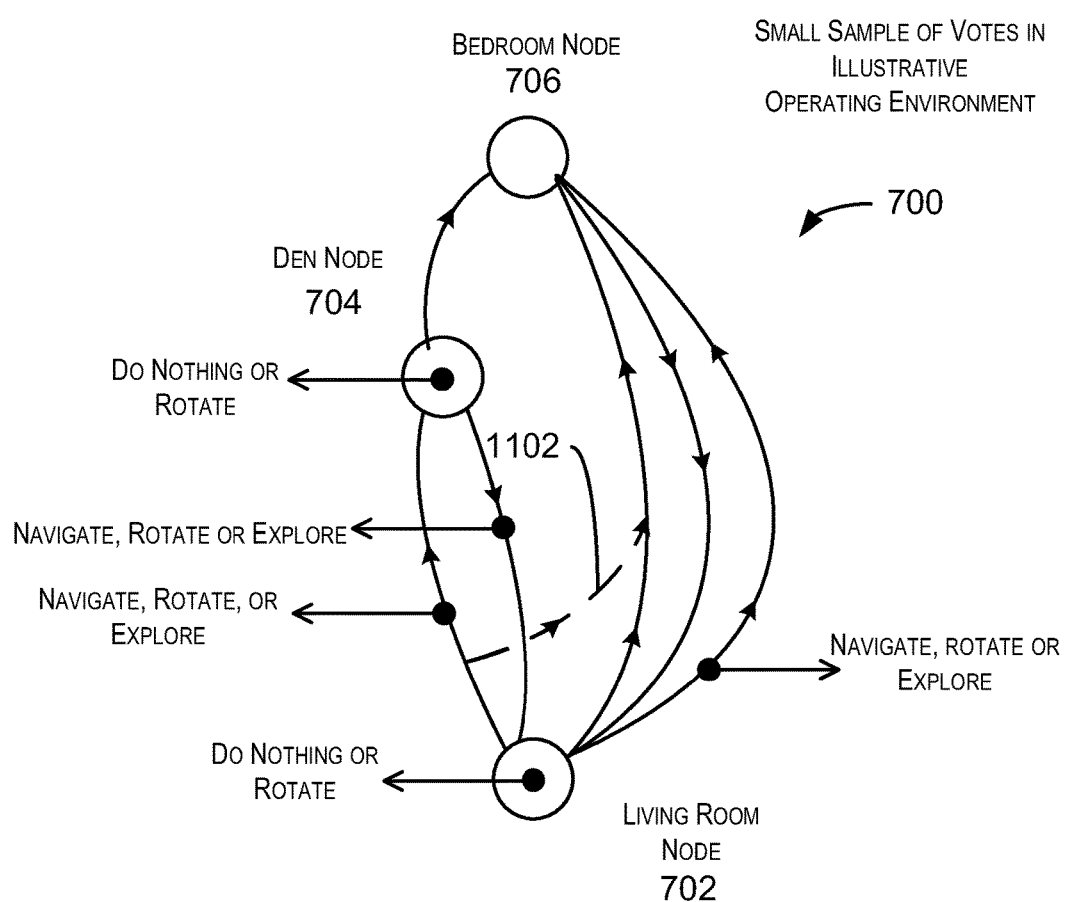
FIG. 11 is a schematic of the transitions described above in the context of a directed graph.

FIG. 11 is a schematic of the transitions described above in the context of a directed graph 700. As shown there, the node locations (702, 704, 706) vote for either "do nothing" or rotate. The edge locations vote for navigate, rotate, or explore. Further, the metric-accurate localization provided by the 3D point cloud may be used to "hop" from one edge to a different edge if that route may allow a more efficient transition to a target destination, as indicated by reference number 1102. Such a hop may allow the agent to reach another node without having to pass through intermediate nodes.

Figure 12:
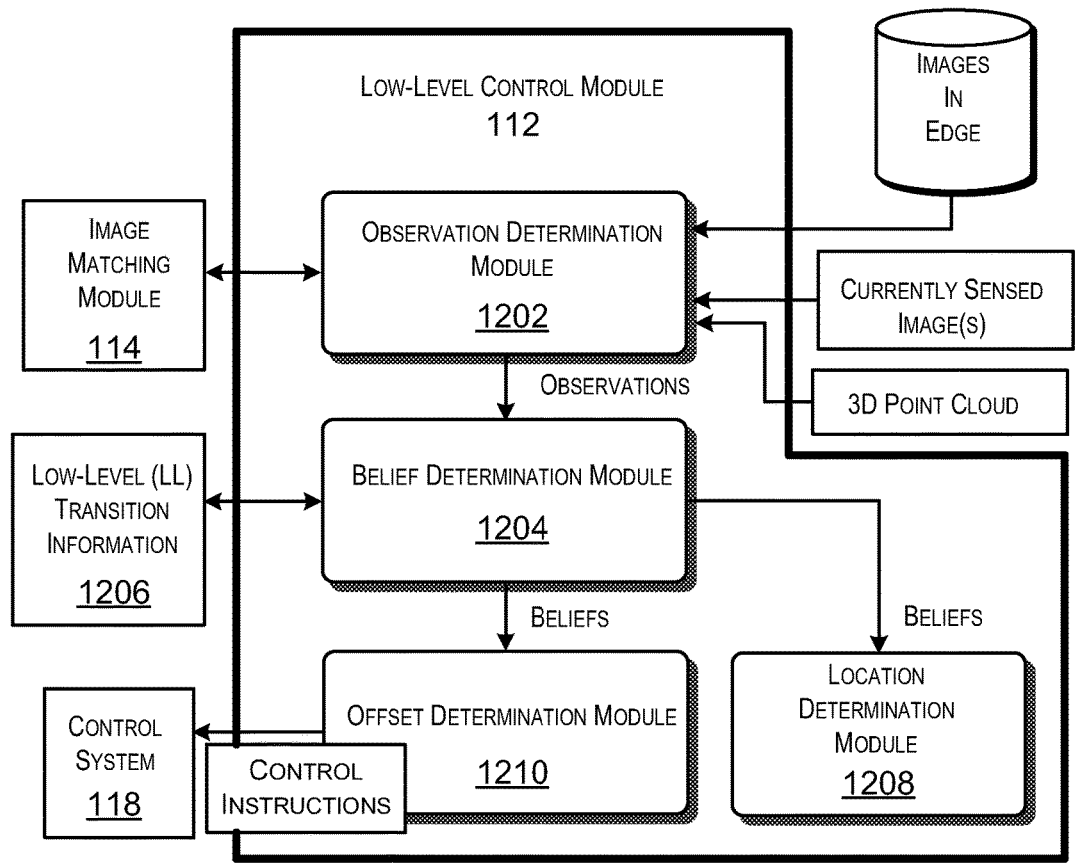
FIG. 12 is a block diagram of the low-level (LL) control module introduced in FIG. 1.

FIG. 12 is a block diagram of the low-level (LL) control module 112 introduced in FIG. 1. The LL control module 112 is specifically invoked when the HL control module 110 selects a vote of navigate. The LL control module 112 then performs a series of tasks which implement the navigation of the agent 100 along a selected edge.

The HL control module 110 may select a vote of navigate, but it remains a question of what edge is to be called upon to perform the navigation. In one case, the HL control module 110 selects the edge having the highest vote score. That vote score may be based on the belief that has been determined for that particular edge location l or may be based on the metric-accurate location provided by a comparison to a 3D point cloud. That vote score may also reflect a determination of a cost associated with using that edge to reach the destination location. In another case, the edge most proximate to the metric-accurate location may be selected.

In the LL control module 112, an observation determination module 1202 performs an analogous function to the observation determination module 1002 of the HL control module 110. Namely, the observation determination module 1202 receives the current input image and provides access to a collection of graph images in the directed graph or to the 3D point cloud. Here, however, the observation determination module 1202 specifically interacts with a collection of graph images associated with the selected edge to be traversed by the agent 100. Similarly, the observation determination module 1202 may interact only with that portion of the 3D point cloud most likely to be associated with the present location. With the assistance of the image matching module 114, the observation determination module 1202 generates observations which reflect the extent of similarity between the input image and the graph images along the edge.

A belief determination module 1204 performs an analogous function to the belief determination module 1004 of the HL control module 110. Namely, the belief determination module 1204 uses Equation (2) to generate updated beliefs which identify the probability that the input image corresponds to one of the images along the edge. Here, however, the POMDP approach is based on a consideration of images i, rather than locations l.

$$b^{t+1}(i) = p(O \mid i) \cdot \sum_{M}^{all\ locs\ over\ edge} p(i \mid M, a) \cdot b^{t}(M). \quad (2)$$

That is, $b^{t+1}(i)$ reflects the assessed likelihood that the input image corresponds to image i along an edge. $b^{t}(M)$ refers to the previously calculated belief (from a prior sample interval). p(i|M, a) refers to the transition probability that the agent 100 correspond to image i given the assumption that the agent 100 is performing action a with respect to image M. In this case, the action a corresponds to the speed of advancement of the agent 100 along the edge. Collectively, the transition probabilities for p(i|M, a) correspond to low-level (LL) transition information 1206. The sum of the p(i|M, a)·$b^{t}(M)$ over all locations in the edge can be referred to as a filtering factor because it has the effect of discounting possibilities in view of the prevailing movement of the agent 100. In other words, the filtering factor again takes the system dynamics into account to improve its probabilistic analysis of the location of the agent 100.

Figure 13:
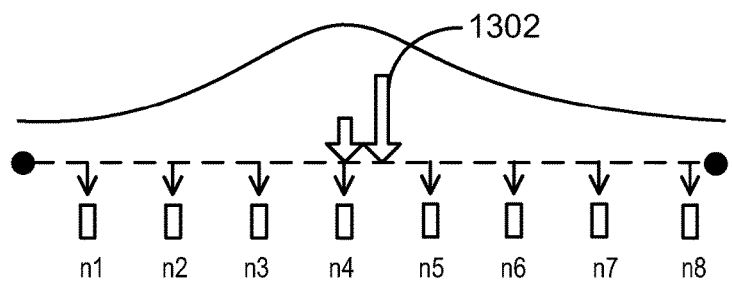
FIG. 13 is a plot of the beliefs generated by the belief determination module.

FIG. 13 is a plot of the beliefs generated by the belief determination module 1204. The series of beliefs establishes a probability distribution over the edge. A peak of the distribution may correspond to the image along the edge that is most likely to be associated with the location of the agent 100. Recall that images along the edge are arranged in a predetermined order and are annotated with some kind of sequence number or index, such as a timestamp. In the present case, image n4 corresponds to the image having the highest belief. The comparison of the current input image or images to the 3D point cloud may provide a more precise location 1302.

Returning to FIG. 12, a location determination module 1208 provides further insight into the probable location of the agent 100 along the edge. One way that the location determination module 1208 can perform this function is by identifying the image along the edge that has the highest belief value (which is n4 in the example of FIG. 13). The location determination module 1208 can then divide the sequence number of this image (n4) by the total number of images on the edge (which is 8 in the case of FIG. 13). This ratio provides some indication of the physical location of the agent 100 on a transition path between one location in the environment 400 and another location. The location determination module 1208 can also determine the location of the agent 100 by the metric-accurate location determined from the comparison of the current image or images to the 3D point cloud. This location can provide a precise location 1302 that the agent 100 is located along the edge.

The LN module 108 (FIG. 1) can use the results of the location determination module 1208 for different purposes. In one case, the LN module 108 can use the results to determine when the agent 100 has arrived at its destination location. In one case, the LN module 108 can determine that the agent 100 has arrived at its destination location when it reaches the last Z % of the transition path, such as 5%. The LN module 108 can also use the results of the location determination module 1208 to calculate the costs of various action options, such as navigate, rotate, etc., or the costs of leaving a portion of the directed graph to navigate directly to a destination or hop to a new edge.

An offset determination module 1210 determines an offset between the current input image and the images along the edge. It then passes this offset to the control system 118. The control system 118 uses this value to control the movement of the agent 100 along the edge. To illustrate the operation of the offset determination module 1210, consider the scenario shown in FIG. 14.

Figure 14:
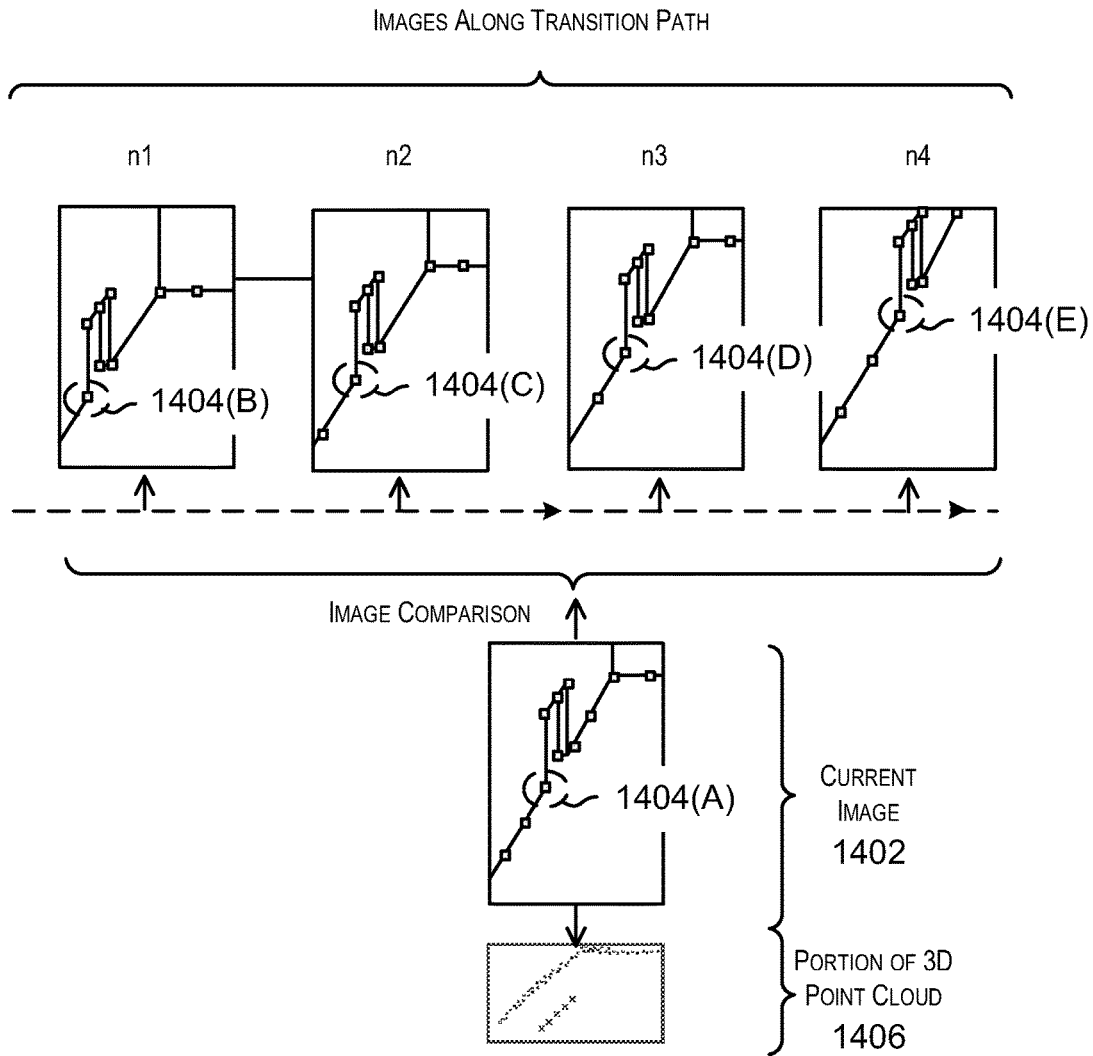
FIG. 14 is a schematic of a comparison of a current image with images associated with an edge.

FIG. 14 is a schematic of a comparison of a current image with images associated with an edge. This comparison may be performed by the low-level control module of FIG. 12. Here, there are at least four graph images (n1, n2, n3, and n4) along the edge. The current input image corresponds to input image 1402. Each of the images in FIG. 2 can be characterized by a set of distinguishing features. For example, the input image 1402 includes a feature 1404(A) corresponding to a corner or other edge in the image. The graph images (n1, n2, n3, and n4) resemble the input image 1402, and therefore also include this distinguishing feature. That is, graph image n1 includes corresponding feature 1404(B), graph image n2 includes corresponding feature 1404(C), graph image n3 includes corresponding feature 1404(D), and graph image n4 includes corresponding feature 1404(E), and so on.

The offset determination module 1210 computes the offset by considering the displacement of one or more features in the input image 1402 from one or more features in one or more graphs images. In the context of FIG. 14, this means that the offset determination module 1210 computes the offset of feature 1404(A) from one or more counterpart features (B, C, D, and E) in the graph images. This process can be repeated for all the features in the images. More formally stated, the offset can be computed by:

$$\zeta = \sum_{k}^{all\ features} \sum_{i}^{all\ images\ in\ edge} (x_{ik} - f_{zk}) \cdot b(i). \quad (3)$$

Here, the index i refers to a graph image in the edge, z refers to the input image, k refers to a common feature in the figures, $x_{ik}$ refers to a position of the feature k in the graph image i, $f_{zk}$ refers to a position of the feature k in input image z, and b(i) refers to the current belief value assigned to image i. The term $(x_{ik}-f_{zk}) \cdot b(i)$ is summed over different images i and different features k to generate the final offset $\zeta$. Less formally stated, Equation (3) can be said to compute the offset in a probabilistic manner by based on the variable contribution of different images to the offset. If there is only a small probability that an input image corresponds to a particular image along the edge, then the weighting factor b(i) will appropriately diminish its influence in the determination of the final offset value.

Simplified versions of Equation (3) can also be used. Instead of taking into consideration all the graph images along the edge, the offset determination module 1210 can determine the final offset based on a comparison of the input image with just the best-matching graph image associated with the edge, or with just a subset of best-matching graph images, as optionally weighted by the beliefs associated those matching graph images. As stated, the control system 118 controls the movement of the agent 100 along the edge based on the offset.

The probabilistic determination of the location may be used to select an appropriate portion 1406 of a 3D point cloud for further localizations. This portion 1406 of the 3D point cloud may be compared to features in the current image 1402 to identify a metric-accurate location for the agent 100.

Figure 15:
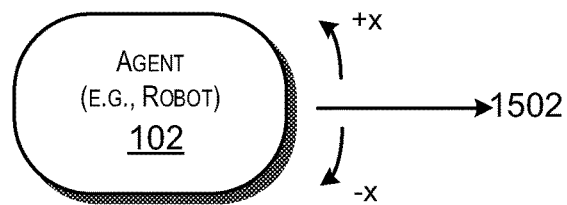
FIG. 15 is a schematic of a control procedure for an agent.

FIG. 15 is a schematic of a control procedure for an agent. The control of the agent 100 can be based on an offset which is generated as a result of the comparison shown in FIG. 14. In FIG. 15, the agent 100 seeks to move along a transition path 1502. The offset can control a power-left and power-right control that is applied to the motor(s) of the agent 100, causing the agent 100 to move in the illustrated +x direction or the −x direction.

The control system 118 can use a controller of any type to control the motor(s) of the agent 100, based on the offset. For example, the control system 118 can use a PID (proportional-integral-derivative) controller or a PI (proportional-integral) controller that uses a closed-loop approach to attempt to minimize an error between the offset and the current position of the agent 100.

Figure 16:
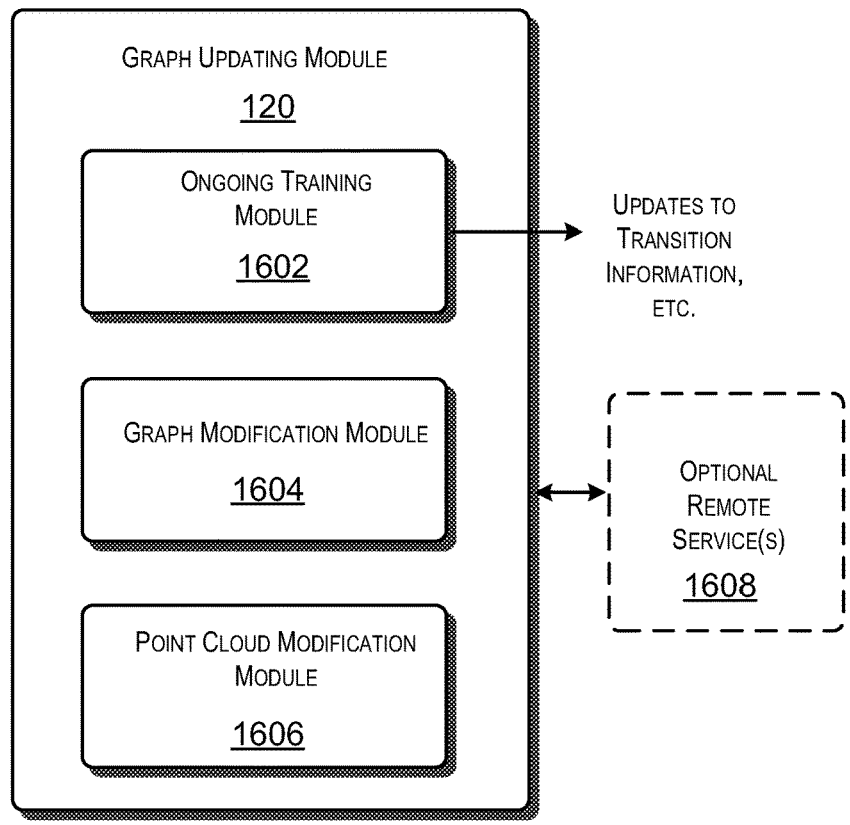
FIG. 16 is a block diagram of the graph updating module of FIG. 1.

FIG. 16 is a block diagram of the graph updating module 120 of FIG. 1. As discussed with respect to FIG. 1, the graph updating module 120 can update the directed graph or 3D point cloud in various ways or update the configuration information used to govern the operation of the LN module 108.

The graph updating module 120 can include an ongoing training module 1602. The ongoing training module 1602 may be used to modify the directed graph or the configuration information as a result of navigation that is performed by the agent 100 within the environment 400 in a real-time mode of operation. In one example, the ongoing training module 1602 adds a new edge to the directed graph when the agent 100 successfully navigates from one node location to another node location. In another example, the ongoing training module 1602 adjusts the HL transition information 1006 and/or the LL transition information 1206 on the basis of navigation performed within the environment 400. In another example, the ongoing training module 1602 adjusts any other configuration information as a result of navigation performed within the environment. It is also possible to make other corrective modifications upon performing navigation that is deemed unsuccessful.

Further, the agent 100 can be placed in an explore mode in which it essentially wanders through the environment in an unsupervised manner, capturing images in the process. The ongoing training module 1602 can supplement its information regarding node locations based on images captured in this process. The ongoing training module 1602 can also add new edges based on images captured in this process.

A graph modification module 1604 performs any kind of maintenance on the graph at any time. For example, the graph modification module 1604 can perform analysis that identifies similar images associated with the directed graph. Based on this analysis, the graph modification module 1604 can prune (remove) one or more edges that are determined to be redundant with one or more other edges. The graph modification module 1604 can also add new juncture points (nodes) to edges to improve the performance of the agent 100, as described with respect to FIG. 17.

A point cloud modification module 1606 may add indices representing new features or rooms to the global 3D point cloud for the environment, for example, during the explore mode. The point cloud modification module 1606 may also remove indices that correspond to features that are no longer present. For example, if a chair 804 (FIG. 8) has been moved to a different room, the point cloud modification module 1606 may remove the indices representing the chair 804 from the global list. During subsequent exploration or movement, new indices representing the chair 804 may be added back to the global list showing the location in the new room.

An optional remote service 1608 is shown in FIG. 16, which may correspond to a computing system that is local with respect to the environment or remote with respect to the environment. In the latter case, the remote service 1608 can be coupled to the agent 100 via a network of any type, such as a wide area network (e.g., the Internet).

The remote service 1608 can store any type of image information, graph information, 3D point cloud information, and configuration information. Such storage can supplement the local storage of information in store 106 or replace the local storage of information in store 106. In addition, or alternatively, the remote service 1608 can perform any of the graph-related updating tasks. Such update-related processing can supplement the processing performed by the graph updating module 120 or replace the processing performed by the graph updating module 120. In one case, the remote service 1608 can download the results of its analysis to the agent 100 for its use in the real-time mode of operation. In yet another implementation, the agent 100 can consult any information maintained in the remote service 1608 during the real-time mode of operation.

Figure 17:
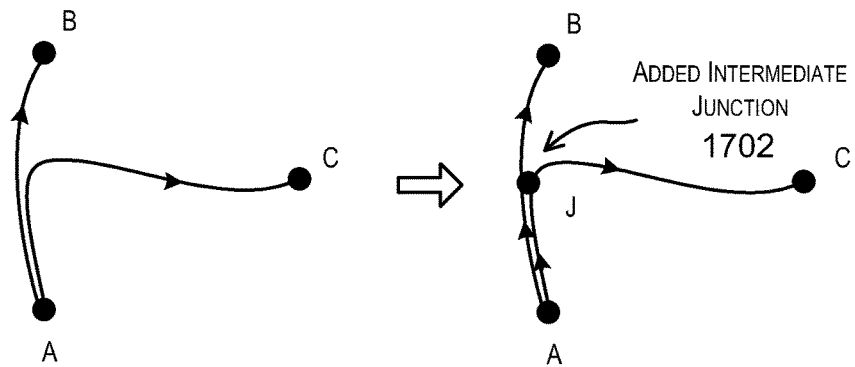
FIG. 17 is a schematic of the addition of a new juncture point to a directed graph.

FIG. 17 is a schematic of the addition of a new juncture point to a directed graph. In FIG. 17, a first edge links node location A and node location B, while a second edge links node location A and node location C. Assume further that these two edges represent transition paths that follow the same course up to some point, but then diverge towards different destinations (B and C, respectively). The graph modification module 1604 can address this situation by adding a juncture point (or node) J 1702 at the point where the edges diverge. This partitions the directed graph, creating four edges, two edges segments from A to J, a third edge segment from J to B, and a fourth edge segment from J to C.

Adding the new juncture point J 1702 may advantageously reduce conflicting votes among edge locations. Say, for example, that the destination node is node B. The edge from A to B is the actor which is expected to generate the desired vote of navigate. However, the edge from A to C presumably has similar images to the edge from A to B over the initial span in which they generally coincide. As such, the edge from A to C may generate relatively high probabilistic beliefs when the agent 100 is "near" node A, which may result in strong votes for an inappropriate action, such as rotate. By adding the juncture point J 1702, the two edges which connect locations A and J will not generate conflicting votes.

The metric-accurate location may also be used to add a juncture point. For example, if the agent 100 determines that an edge is physically proximate to another edge, it may add a juncture point at the location that the two edges diverge.

B. Illustrative Processes

FIGS. 18-29 show methods that set forth the operation of the agent 100 in flowchart form. Since the principles underlying the operation of the agent 100 have already been described in Section A, many of the operations will be addressed in summary fashion in this section. The methods discussed with respect to FIGS. 18-29 may be implemented in any number of systems, for example, as modules, code, hardware, or any combinations thereof. In an embodiment, the methods are implemented as computer code stored in computer readable storage, as discussed with respect to FIG. 29.

Figure 18:
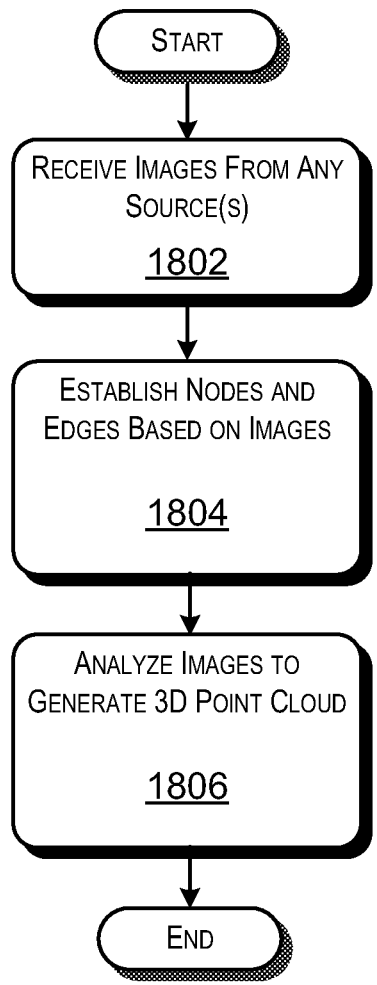
FIG. 18 is a block diagram of a method of training the agent of FIG. 1.

FIG. 18 is a block diagram of a method 1800 of training the agent 100 of FIG. 1. At block 1802, the agent 100 receives any type of images from any source in any manner. At block 1804, the agent 100 generates the directed graph based on the images and associated labels. The graph can include constituent nodes and edges. At block 1806, the images are analyzed, in the pairwise, iterative fashion describe with respect to FIG. 8, to generate the 3D point cloud for the environment.

Figure 19:
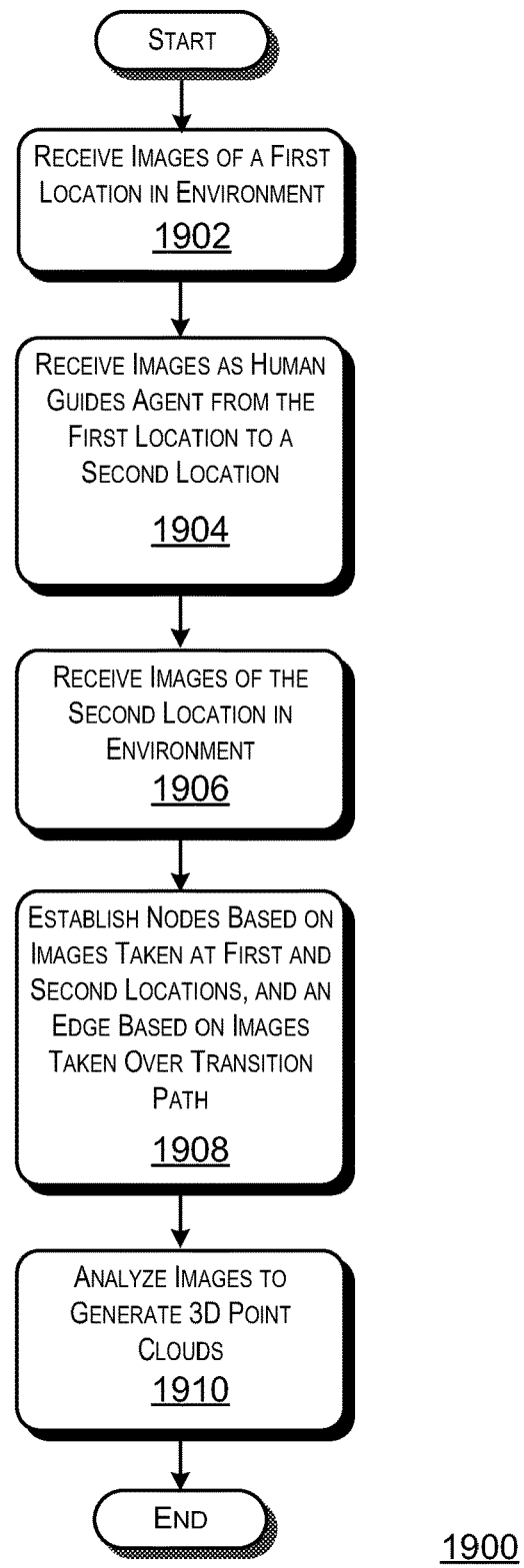
FIG. 19 is a block diagram of a method for manually training the agent of FIG. 1.

FIG. 19 is a block diagram of a method 1900 for manually training the agent 100 of FIG. 1. At block 1902, the agent 100 is guided to a first location in an environment by a human trainer. At that point, the agent 100 receives images of the first location. At block 1904, the agent 100 receives images as the human trainer guides the agent 100 from the first location to a second location. At block 1906, the agent 100 receives images of the second location.

At block 1908, the agent 100 establishes a first node based on the set of images captured at the first location and a second node based on the set of images captured at the second location. The agent 100 also establishes an edge based on the images taken in transit from the first location to the second location. In one case, there is no sharp demarcation between the three sets of images described above. For instance, the first set of images and the second set of images may share a subset of images with the edge-related images. At block 1910, the images from the first location, the second location, and the transition are used to generate a 3D point cloud representing the environment.

Figure 20:
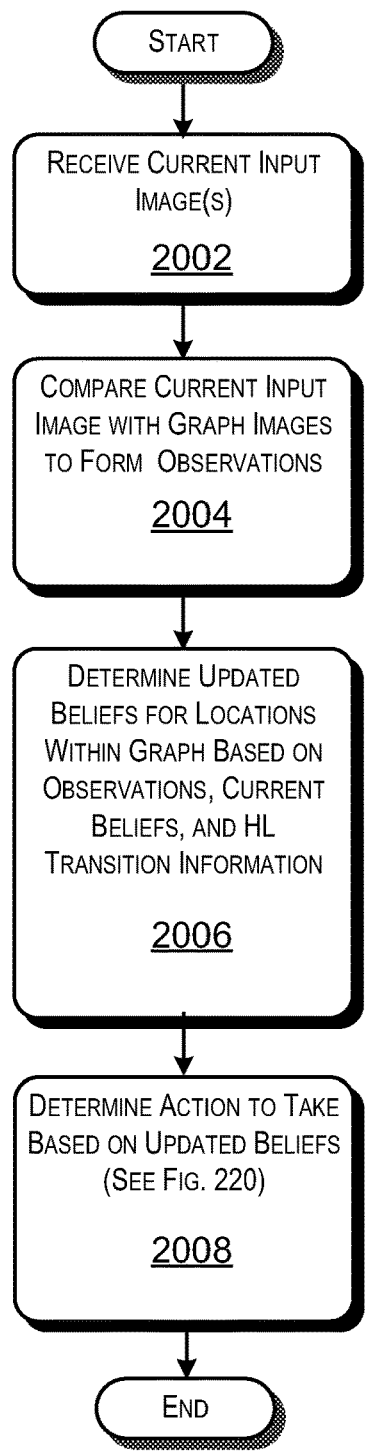
FIG. 20 is a block diagram of a method for a high-level controlling operation performed by the agent of FIG. 1.

FIG. 20 is a block diagram of a method 2000 for a high-level controlling operation performed by the agent 100 of FIG. 1. At block 2002, the agent 100 receives one or more current input images based on its current position within the environment. To simplify the description, the high-level controlling operation will be explained in the context of the receipt of a single input image. At block 2004, the agent 100 compares the current input image with graph images to provide a series of observations associated with different locations in the directed graph. At block 2006, the agent 100 determines updated beliefs based on Equation (1) described above. As previously explained, the updated beliefs are based on observations, current beliefs, and the HL transition information 1006. Further, the updated beliefs may be based on a metric-accurate location determined by comparing features in a current input image to a 3D point cloud.

At block 2008, the agent 100 determines an action to take based on the updated beliefs. If a metric-accurate position is available, the actions may include a direct navigation to a target location or a hop to a different (more efficient) edge in the directed graph. For example, in the directed graph shown in FIG. 17, if the agent 100 were traveling from node 'B' to node 'C' via node 'A', the metric-accurate location may be useful to identify that the agent 100 is proximate to the edge between 'A' and 'C', even without the addition of node T 1702. At that location, the agent 100 may leave the B-A edge, transition to the A-C edge, and restart navigation along the A-C edge. Further, the proximate location information provided via the 3D point cloud may be used to add node J 1702 at the point shown in FIG. 17.

Figure 21:
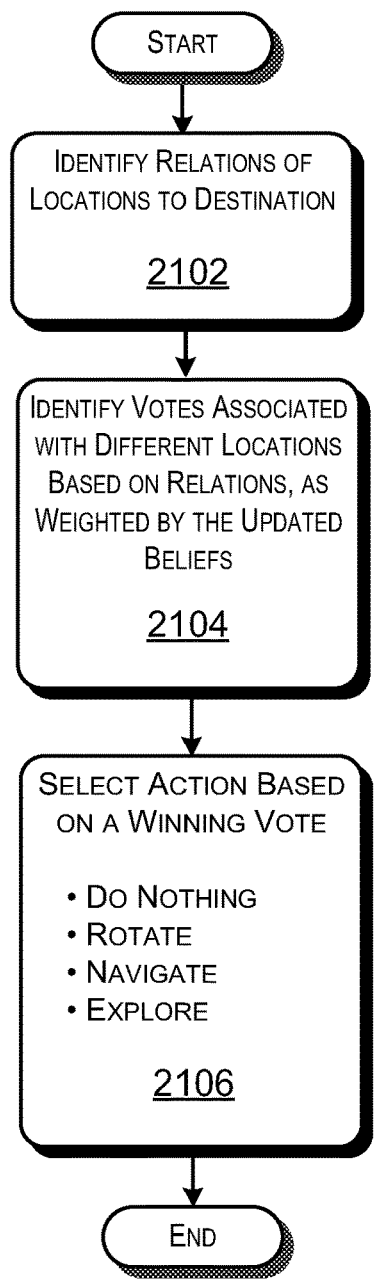
FIG. 21 is a block diagram of a method for selecting an action.

FIG. 21 is a block diagram of a method 2100 for selecting an action. At block 2102, the agent 100 identifies, for each location in the directed graph, the relation of this location to a destination location.

At block 2104, the agent 100 identifies votes associated with different locations in the directed graph. As discussed in Section A, the agent 100 can generate these votes based on the relations determined at block 2102. The agent 100 reweights the votes by the updated beliefs. The agent 100 can also take into account costs associated with traversing different routes to achieve the destination location. At block 2106, the agent selects the vote with the high score. The selected action may correspond to "do nothing," rotate, navigate, or explore. Based on a metric-accurate location determined from a 3D point cloud, other actions may be selected without voting, such as "proceed to destination" or "hop" to a different edge.

Figure 22:
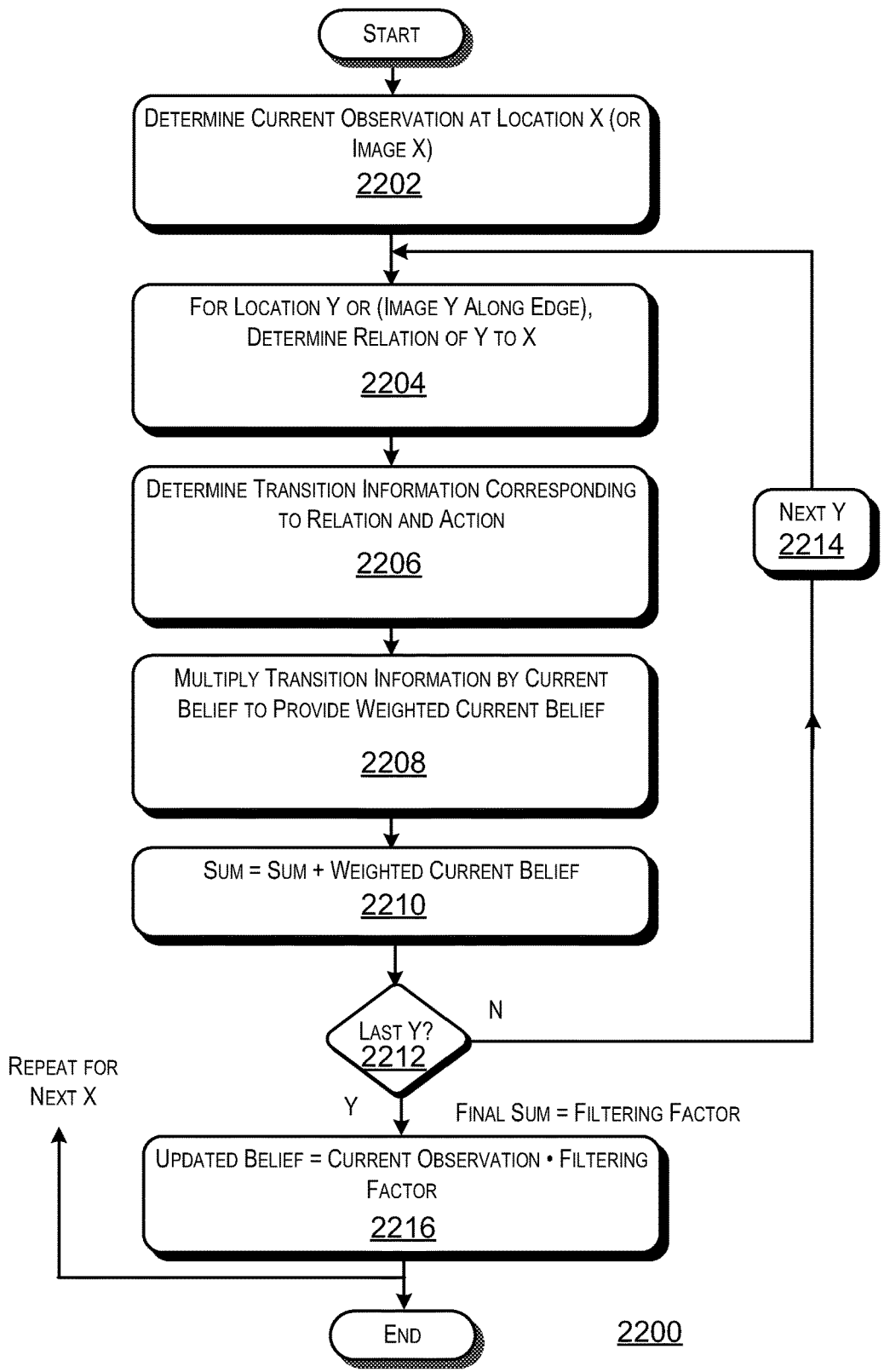
FIG. 22 is a block diagram of a method for updating a belief which can be performed by the agent of FIG. 1.

FIG. 22 is a block diagram of a method 2200 for updating a belief which can be performed by the agent of FIG. 1. This belief update operation can be performed by the HL control module 110 (in the context of locations) or by the LL control module 112 (in the context of images). In other words, the method 2200 expresses both Equations (1) and (2) in flowchart form. To simplify the explanation, the method 2200 will be described here in the first scenario, e.g., in the context of processing performed by the HL control module 110.

At block 2202, the agent 100 determines a current observation at a location X, based on image-matching analysis performed with respect to the input image. At block 2204, the agent 100 begins an inner summation loop by determining a relation of a location Y to the location X. At block 2206, the agent 100 looks up a transition probability within the HL transition information 1006 associated with the relation identified at block 2204 and an action being taken by the agent 100. At block 2208, the agent 100 multiples the transition probability provided at block 2206 by the current belief associated with location X. At block 2210, the agent 100 updates the sum based on the result of block 2208.

At block 2212, the agent 100 determines whether the last location Y has been processed. If not, at block 2214, the agent 100 advances to the next location Y and repeats the above-identified operations for the new location Y. Upon processing the last location Y, the agent 100 will have generated the sum identified in Equation (1), referred to as a filtering factor herein.

At block 2216, the agent 100 multiplies the filtering factor by the current observation provided at block 2202. This provides the updated belief for location X. FIG. 22 indicates that the entire method described above can then be repeated for another X within the directed graph. Parts or even all of the method 2200 may be skipped if a metric-accurate location is available using a 3D point cloud.

The HL transition information 1006 used within the method 2200 can be implemented as a table which provides relations between Y and X on a first axis, and different actions on another axis. The body of the table provides different transition probabilities associated with different combinations of relations and actions.

FIG. 23 is an example of a translation table. This transition table may illustrate information that can be used as the high-level transition information 1006 discussed with respect to FIG. 10. In this example, "SameLocation" refers to a relation in which Y is the same location as X. "EdgeTowards" refers to a relation in which Y is an edge that leads towards X. In "EdgeGoingAway," Y is an edge that goes away from X. In "OriginForEdge," Y is a location that is the starting point for edge X. In "DestinationForEdge," Y is a location that is the end point (destination) for edge X. In "OtherElement," Y is a location different than X. In "ElementsSharingEdge," Y is a location that is connected through a single edge, to location X. In "EdgeWithSharedOrigin," Y is an edge that shares an origin location with edge X. In "EdgeWithSharedDestination," Y is an edge that shares a destination location with edge X. In "ReverseEdge," Y is the reverse edge to edge X (goes from location B to A and X goes from A to B). In "EdgeThroughOneInterM," Y is an edge that has a single intermediary location between it and edge X. In "EdgeThroughTwoInterM," Y is an edge that has two or more intermediary locations between it and edge X.

The particular transition probabilities identified in the translation table are illustrative and non-limiting. Further, in one implementation, the agent 100 can modify the values of these transition probabilities based on the navigation performance of the agent 100. In addition, a metric-accurate location may be used to change the probabilities in the table.

Figure 24:
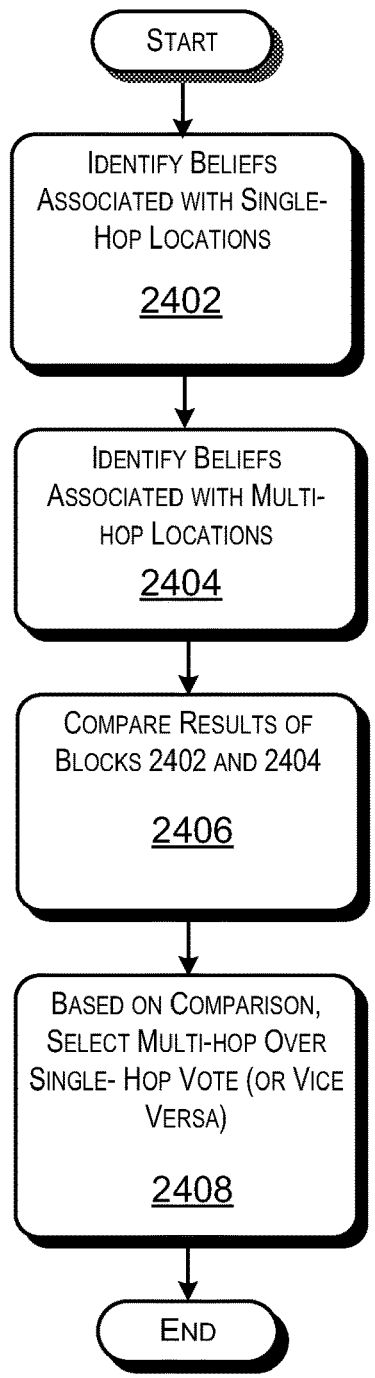
FIG. 24 is a block diagram of a method for navigating using a multi-hop selection operation.

FIG. 24 is a block diagram of a method 2400 for navigating using a multi-hop selection operation. This is a specific operation encompassed by the high-level control operation of FIGS. 21 and 22. As described above, a multi-hop route between two nodes encompasses two or more edges. A single-hop route involves a single edge.

At block 2402, the agent 100 identifies beliefs and/or costs associated with single-hop locations. The single-hop locations correspond to locations that will direct the agent 100 to a destination node using a single edge.

At block 2404, the agent 100 identifies beliefs and/or costs associated with multi-hop locations. The multi-hop locations correspond to locations that will direct the agent 100 to the destination node using two or more edges.

At block 2406, the agent 100 can perform any type of comparative analysis to account for the results of block 2402 and 2404. In one case, the agent 100 can sum the beliefs associated with the single-hop locations to generate a first sum, and sum the beliefs associated with the multi-hop locations to generate a second sum. Then, the agent 100 can compare the first sum with the second sum. Further, at this block, the agent 100 can determine if costs will be lower by hopping from one edge to another edge. For example, if the agent is located on an edge that does not have a direct route to the target location, but is proximate to another edge that does have a direct route to the target location. This may be determined from the metric-accurate location provided by using a 3D point cloud.

At block 2408, the agent 100 can select a multi-hop route over a single-hop route, or vice versa, based on the analysis provided at block 2406. For example, suppose that the sum of the multi-hop beliefs is considerably larger than the sum of the single-hop beliefs. This suggests that it will probably be more fruitful to select a multi-hop route over a single-hop route. However, if the sum of the multi-hop beliefs is not significantly larger (e.g., at least 100 times larger) than the sum of the single-hop beliefs, then the agent 100 may decide to ignore the multi-hop beliefs. This summing and thresholding operation is useful to stabilize the performance of the voting between multi-hop options and single-hop options. Without this provision, there may be an undesirable amount of noisy flip-flopping between multi-hop options and single-hop options (e.g., because different options may have very similar vote scores). In other words, the summing and thresholding option make it more likely that when a multi-hop option is invoked, it is truly the appropriate course of action. The agent 100 may also determine that is worthwhile, based on the metric-accurate location, to leave the current edge and transition to another edge in the directed graph, for example, if there is a more efficient route to the target location via the new edge.

Figure 25:
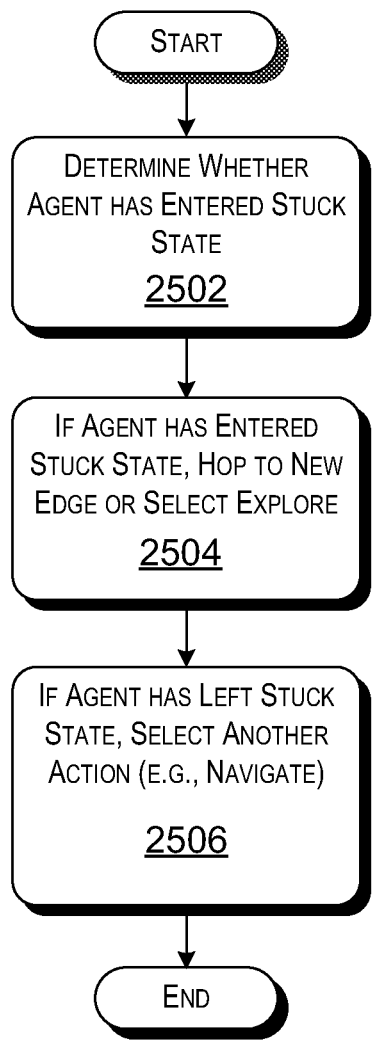
FIG. 25 is a block diagram of a method for an explore-mode selection operation.

FIG. 25 is a block diagram of a method 2600 for an explore-mode selection operation. The explore-mode selection operation is another specific operation encompassed by the high-level controlling operation of FIGS. 20 and 21. At block 2502, the agent 100 determines whether it has entered a stuck state. The stuck state is characterized by a state in which the agent 100 is not making progress toward a destination location. The agent 100 can determine that this state has been reached based on any combination of context-specific criteria. In one case, the agent 100 can determine that the stuck state has been reached based on an amount of time that has transpired in attempting to reach the destination location (in relation to normal expectations). In addition, or alternatively, the agent 100 can determine that the stuck state has been reach based on the number of options that have been investigated in attempting to reach the destination location. In another case, the agent 100 may determine that a stuck state has been reached if a feature that is not in the current 3D point cloud presents an obstacle to reaching the destination.

At block 2504, if in a stuck state, the agent 100 may use the metric-accurate location to determine that it can hop from one edge in the directed graph to another edge in the directed graph in an attempt to circumnavigate the obstacle. If this is not successful, the agent 100 may enter an explore mode of operation. In the explore mode, the agent 100 uses depth information and/or visual information to move towards what it perceives as the largest open space available to it. The agent 100 will attempt to avoid obstacles in this mode, but otherwise has no overarching goals governing its navigational behavior. The agent 100 is simply attempting to wander into a region which will present a different set of navigational opportunities, associated with a different set of probabilistic beliefs.

At block 2506, the agent 100 determines that it is no longer in the stuck state, such as if no further obstacles are presented on the new edge, or a new position is found during the explore mode. At this point, if the agent 100 is in the explore mode, it abandons the explore mode and selects another action. The agent 100 can determine that it is no longer in the stuck state based on any combination of factors, such as the amount of time spent in the explore mode, the updated beliefs associated with locations, and so on.

In one implementation, the agent 100 can determine whether it is in a stuck state or in a progress state using the same probabilistic approach described above. Here, the stuck state and progress state correspond to two of the possible states that characterize the operation of the agent 100.

Figure 26:
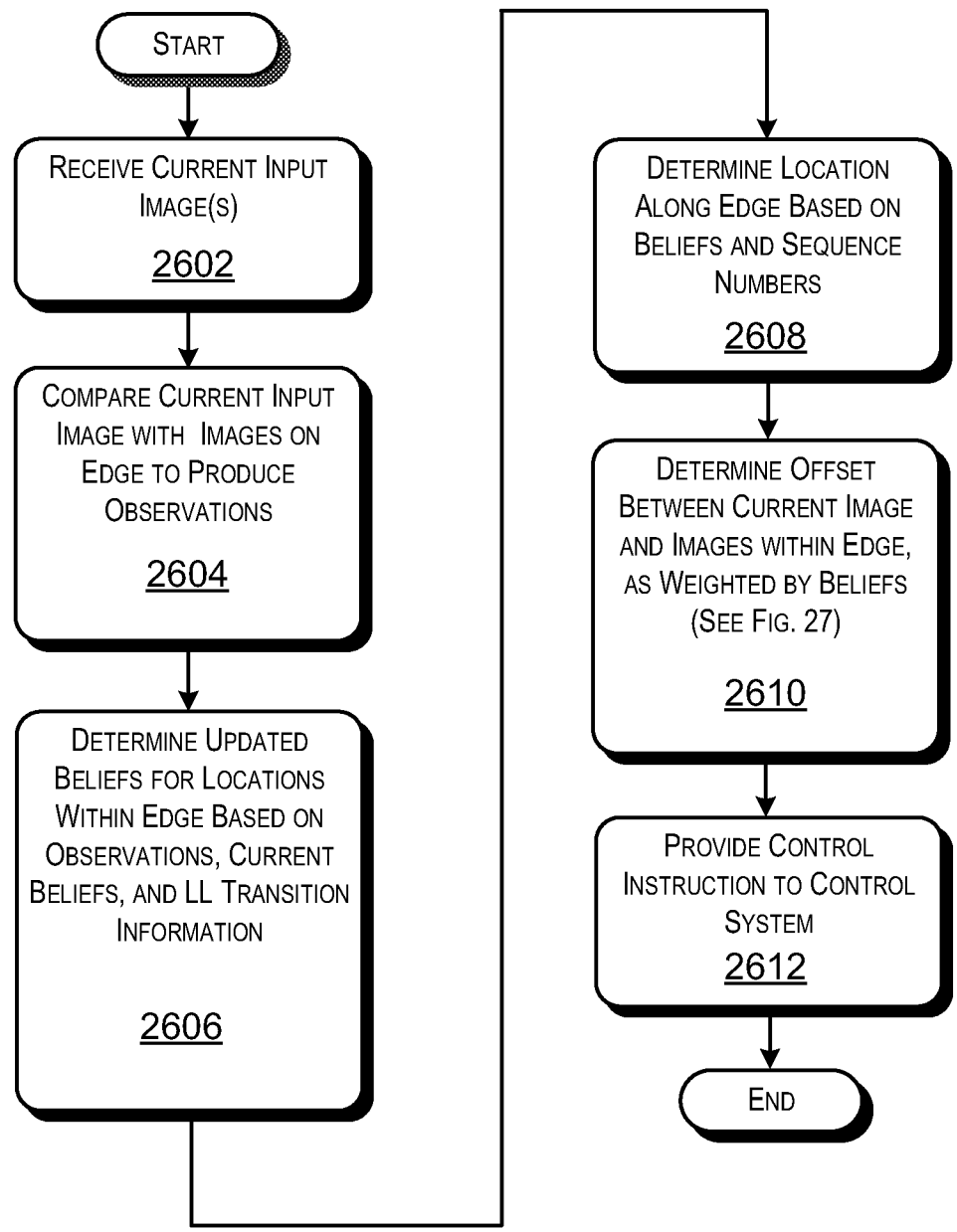
FIG. 26 is a block diagram of a method for a low-level controlling operation performed by the agent 100 of FIG. 1.

FIG. 26 is a block diagram of a method 2600 for a low-level controlling operation performed by the agent 100 of FIG. 1. Recall that, in this method 2600, the LL control module 112 may be attempting to advance the agent 100 along a selected edge. At block 2602, the agent 100 receives a current image. At block 2604, the agent compares the current image with graph images associated with the edge to generate observations. At block 2606, the agent 100 uses Equation (2) to determine updated beliefs. These updated beliefs take account of the observations provided at block 2604, the LL transition information 1106, and the current beliefs. The updated beliefs may also be determined from the metric-accurate location position provided from the comparison of images with a 3D point cloud.

At block 2608, the agent 100 uses the updated beliefs to determine its probable location along the edge. The agent 100 can perform this operation by determining the sequence number associated with an image on the edge having the highest belief value, and dividing this sequence number by the total number of images on the edge.

At block 2610, the agent 100 uses Equation (3) to determine the offset between the input image and the images on the edge, as weighted by the belief provided at block 2606. As noted, the offset may be confirmed using the metric-accurate position information. At block 2612, the agent 100 uses the offset to provide control instructions to the control system 118 of the agent 100, causing the agent 100 to move in the manner shown in FIG. 16.

Figure 27:
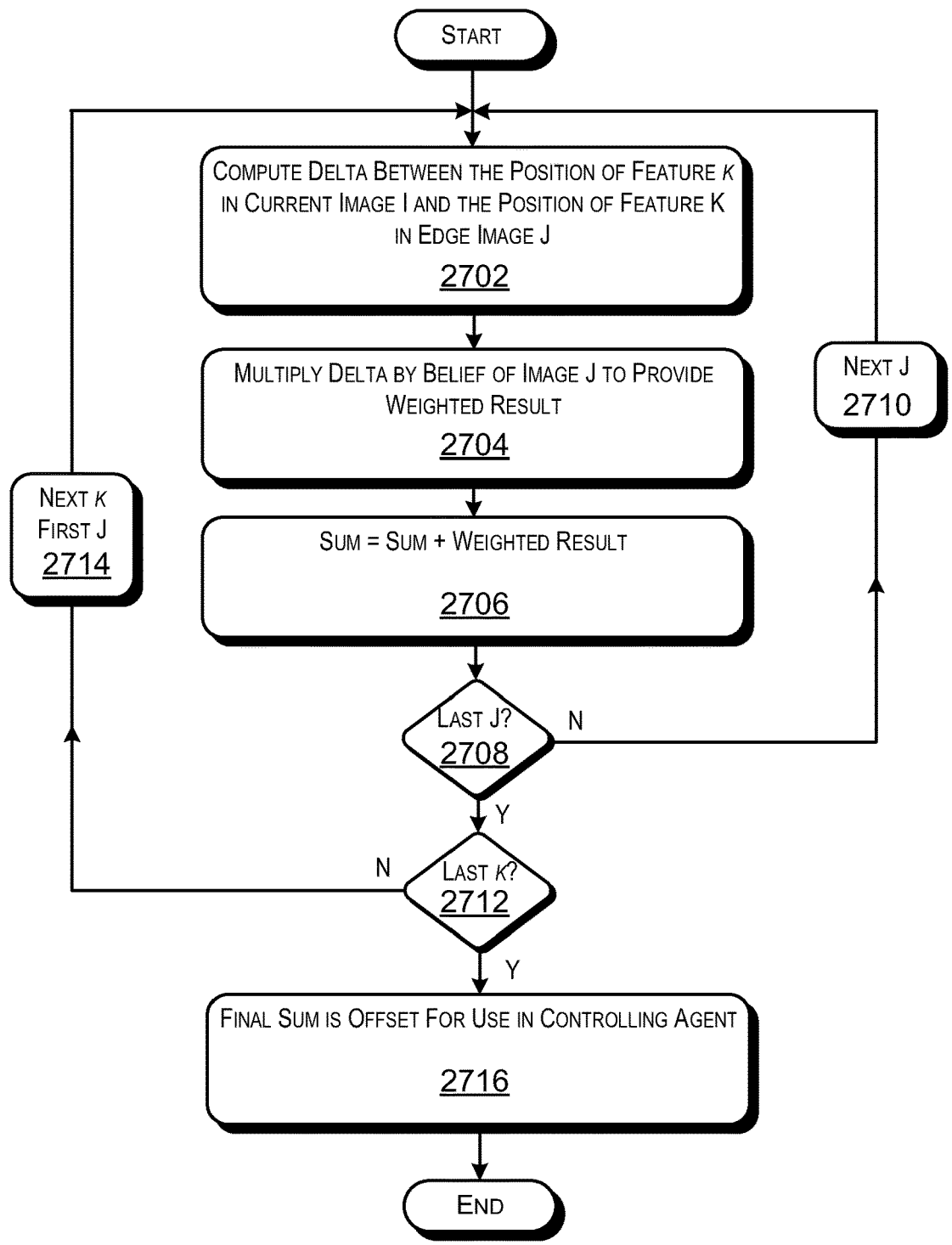
FIG. 27 is a block diagram of a method for determining an offset.

FIG. 27 is a block diagram of a method 2700 for determining an offset. This method 2700 graphically represents the operations performed by Equation (3). At block 2702, the agent 100 computes the difference between the position of feature k in an image I associated with the current input image and the position of feature k in an edge image J. At block 2704, the agent 100 multiples the difference computed at block 2502 by the belief associated with image J. At blocks 2706, 2708, 2710, 2712, and 2714, the agent 100 optionally repeats the above-described process for different images J and different features k. At block 2716, the agent 100 provides a final offset, associated with a sum computed in the proceeding blocks. The agent 100 can use the offset to control the movement of the agent 100 so that it conforms to the transition path associated with the edge. The offset may also be determined more directly by comparing the metric-accurate location to the position along the edge or the distance to the next node.

FIG. 28 is a block diagram of a method 2800 for updating a graph, which may be performed by the agent of FIG. 1. The blocks in the method 2800 represent functions that can be performed separately or together. Thus, FIG. 28 does not show connections between these blocks. At block 2802, the agent 100 adds a new edge to the directed graph upon a successful navigation operation. At block 2804, the agent 100 updates any type of configuration information in response to a navigation operation. For example, the agent 100 can update the transition information used by the HL control module 110 and/or the LL control module 112. At block 2806, the agent 100 performs maintenance on the graph. For example, the agent 100 can remove redundant edges, add new junction points, and so on. At block 2808, the agent 100 performs maintenance on the 3D point cloud. For example, the agent 100 can add indices for features that have appeared in the environment, remove indices for features that have been removed in the environment, and the like.

C. Representative System

FIG. 29 is a block diagram of a system 2900 that can be used to implement the computing functionality for an agent 100, such the modules described with respect to the previous figures. For example, the system 2900 shown in FIG. 29 can be used along with other devices, such as sensors and motors, to implement any aspect of the agent 100. The system 2900 may be located onboard a mobile agent 100, such as a robot, or may be in communications with an agent 100, such as over a wireless network. In one case, the system 2900 may correspond to any type of computing device that includes one or more processing devices.

The system 2900 can include volatile and non-volatile memory, such as RAM 2902 and ROM 2904, as well as various media devices 2906, such as a hard disk module, an optical disk module, and so forth. The system 2900 also includes one or more general-purpose processing devices 2908, as well as one or more special-purpose processing devices, such as one or more graphical processing units (GPUs) 2910. The system 2900 can perform various operations identified above when the processing devices (2908, 2910) execute instructions that are maintained by memory (e.g., RAM 2902, ROM 2904, or elsewhere). More generally, code and other information can be stored on any computer readable storage 2912, including, but not limited to, static memory storage devices, magnetic storage devices, optical storage devices, and so on. Such computer readable storage 2912 may include hard drives, flash drives, digital versatile disks (DVDs), compact disks (CDs), and the like. The term computer readable storage also encompasses plural storage devices.

The system 2900 also includes an input/output module 2914 for receiving various inputs from an environment or a user, via input modules 2916, such as one or more sensors associated with the sensing system 102 of FIG. 1. The input/output module 2914 also provides various outputs to the user via output modules. One particular output mechanism may include a presentation module 2918 and an associated graphical user interface (GUI) 2920. The system 2900 can also include one or more network interfaces 2922 for exchanging data with other devices via one or more communication conduits 2924. One or more communication buses 2926 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A location system, comprising:
a processor configured to implement location modules for an agent, wherein the modules comprise:
a belief determination module configured to determine a predicted location from a probabilistic belief associated with an extent to which the agent is associated with a location represented on a directed graph, based, at least in part, on a comparison of an input image with a plurality of images associated with the directed graph; and
a comparison module configured to analyze a currently collected input image having a highest probability of matching a current location to generate a list of indices representing features in the currently collected input image, and compare each of the indices representing features in the currently collected input image with a dictionary of indices representing locations in a three dimensional (3D) point cloud to obtain a metric-accurate location for the agent.

2. The location system of claim 1, wherein the location is associated with an image of an environment, and the directed graph comprises a plurality of images collected during a training sequence.

3. The location system of claim 1, wherein the 3D point cloud comprises a list of indices, wherein each value in the list of indices is a single number representing a feature in a 3D environment.

4. The location system of claim 1, comprising:
a plurality of sensors configured to obtain visual images of the environment, depth images of the environment, or both;
a motion system configured to move the system through the environment in response to the probabilistic belief, the metric-accurate location, or both.

5. The location system of claim 1, comprising:
a high-level control module configured to determine an action to be taken by an agent within an environment based, in part, on structure of the environment, the high-level control module comprising:
a vote determination module configured to generate a plurality of votes associated with each of a plurality of different locations, each vote identifying an action to be taken by the agent, the plurality of votes being weighted, respectively, by a plurality of probabilistic beliefs; and
a vote selection module configured to select one of the plurality of votes and an associated action based on the plurality of probabilistic beliefs; and
a low-level control module configured to implement a navigation action selected by the high-level control module.

6. The location system of claim 5, wherein the navigation action is a direct navigation action in which the agent uses the metric-accurate position to move towards a target destination.

7. The location system of claim 5, wherein the navigation action is an edge hop action in which the agent uses the metric-accurate position to move from an edge in the directed graph to another edge in the directed graph.

8. The location system of claim 5, wherein the navigation action is selected from:
an edge following action in which the agent follows a nearest edge in the directed graph;
an idle action in which the agent takes no action;
a rotate action in which the agent rotates; and
an explore action in which the agent moves throughout an environment without regard to a destination.

9. The location system of claim 5, wherein the vote determination module is configured to generate a vote for a particular location also based on a relation between that location and a destination location.

10. The location system of claim 9, wherein the vote determination module is configured to generate a vote for a particular location also based on a cost associated with the relation.

11. The location system of claim 10, wherein the cost is determined, at least in part, using the metric-accurate location.

12. The location system of claim 1, wherein the processor comprises a remote computational system in communication with the agent.

13. A method for identifying a location of an agent device, comprising:
comparing, by a processor, a depth image of an environment from a sensor on the agent device with a collection of depth images associated with a directed graph to produce an observation, the directed graph representing a topological representation of the environment;
generating, by the processor, a probabilistic belief for a predicted location based, at least in part, on the observation, the probabilistic belief corresponding to a likelihood that the agent device is associated with an actual location in the directed graph;
analyzing, by the processor, a currently collected depth image associated with a highest probability position to generate a list of indices of three dimensional (3D) features in the currently collected depth image; and
comparing, by the processor, the list of indices of 3D features in the currently collected depth image to a dictionary of indices representing a portion of a 3D point cloud to determine a metric-accurate location for the agent device, wherein the portion is selected based, at least in part, on the probabilistic belief.

14. The method of claim 13, wherein the collection of depth images comprises a first subset of depth images associated with nodes within the directed graph, and a second subset of depth associated with edges between the nodes in the directed graph.

15. The method of claim 13, comprising generating, by the processor, the directed graph by manually guiding the agent device through the environment as the agent device takes depth images within the environment.

16. The method of claim 13, comprising generating the dictionary of indices by:
analyzing a sequence of depth images, by the processor, from the environment by iteratively performing a pairwise comparison on each two sequential depth images, wherein the pairwise comparison is performed by:
creating, by the processor, N sets of alternative 3D positions for each feature in a first depth image, wherein each alternative 3D position comprises a rotation of the feature, a translation of the feature, or both;
creating, by the processor, an index number for each feature in each of the N sets, wherein each index number represents a position in 3D space;
creating, by the processor, an index number for each feature in a next depth image;
comparing, by the processor, the index number for each feature in the next depth image to the list of index numbers for each of the N sets, and incrementing a counter when a substantially matching number is found; and
adding, by the processor, the set with the highest value for the counter to the 3D point cloud.

17. The method of claim 13, comprising:
using, by the processor, the metric-accurate location to make a determination that the agent device is proximate to an edge in the directed graph, wherein the agent device is not currently following the edge; and
using, by the processor, the determination to move the agent device to the edge.

18. The method of claim 13, comprising:
using, by the processor, the metric accurate location to determine that two edges are proximate to each other; and
adding, by the processor, a node to the directed graph that connects the two edges.

* * * * *